US005945195A

United States Patent [19]

McDonald

[11] Patent Number: 5,945,195

[45] **Date of Patent: *Aug. 31, 1999**

[54] METHOD AND APPARATUS FOR PROVIDING FOLDED SHEETS WITH STIFFENERS

[76] Inventor: George Wallace McDonald, Mon Cachet, Rue de la Cache, Castel, Guernsey, Channel Islands, United Kingdom

[ * ] Notice: This patent is subject to a terminal disclaimer.

[21] Appl. No.: 08/204,166

[22] PCT Filed: Sep. 4, 1994

[86] PCT No.: PCT/GB92/01625

§ 371 Date: Mar. 3, 1994

§ 102(e) Date: Mar. 3, 1994

[87] PCT Pub. No.: WO93/05956

PCT Pub. Date: Apr. 1, 1993

[30] Foreign Application Priority Data

Sep. 6, 1991 [GB] United Kingdom .................. 9119132

[51] Int. Cl.$^{6}$ .................................................. B32B 3/06

[52] U.S. Cl. ........................... 428/121; 283/34; 283/106; 402/4; 428/77; 428/99; 428/130; 428/192

[58] Field of Search ............................... 428/121, 77, 99, 428/130, 192; 283/34, 106; 402/4; 281/2, 5, 31

[56] References Cited

U.S. PATENT DOCUMENTS

| | | | |
|---|---|---|---|
| 4,621,442 | 11/1986 | Mack | 428/43 |
| 4,894,106 | 1/1990 | Instance | 428/40.1 |
| 5,156,898 | 10/1992 | McDonald | 428/100 |
| 5,358,761 | 10/1994 | McDonald | 428/77 |

FOREIGN PATENT DOCUMENTS

| | | |
|---|---|---|
| 3332715 | 3/1985 | Germany . |
| 619023 | 2/1949 | United Kingdom . |
| 649841 | 2/1951 | United Kingdom . |
| 660804 | 11/1951 | United Kingdom . |
| 687073 | 2/1953 | United Kingdom . |
| 2141666 | 1/1985 | United Kingdom . |
| 2173448 | 10/1986 | United Kingdom . |
| 2199536 | 7/1988 | United Kingdom . |
| WO 87/04284 | 7/1987 | WIPO . |

*Primary Examiner*—Nasser Ahmad
*Attorney, Agent, or Firm*—McAulay Nissen Goldberg Kiel & Hand, LLP

[57] ABSTRACT

Apparatus and process for use in producing articles each comprising a sheet folded with at least one set of concertina folds which can be unfolded, wherein the article comprises at least one stiff portion attached to an outer segment of the folded sheet, and in which the apparatus is capable of supplying the folded sheet and at least one stiff portion and attach them together and maintain the sheet folded during at least part of the approach to the attaching step.

22 Claims, 10 Drawing Sheets

FIG.5
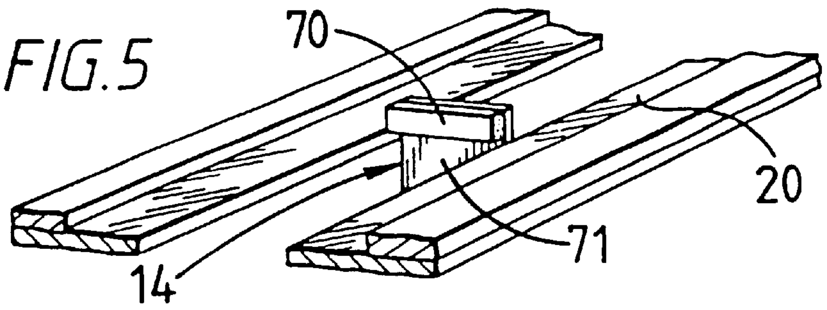
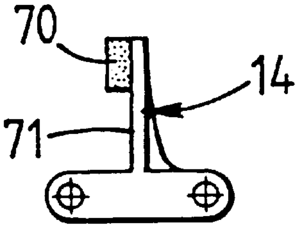
FIG.6
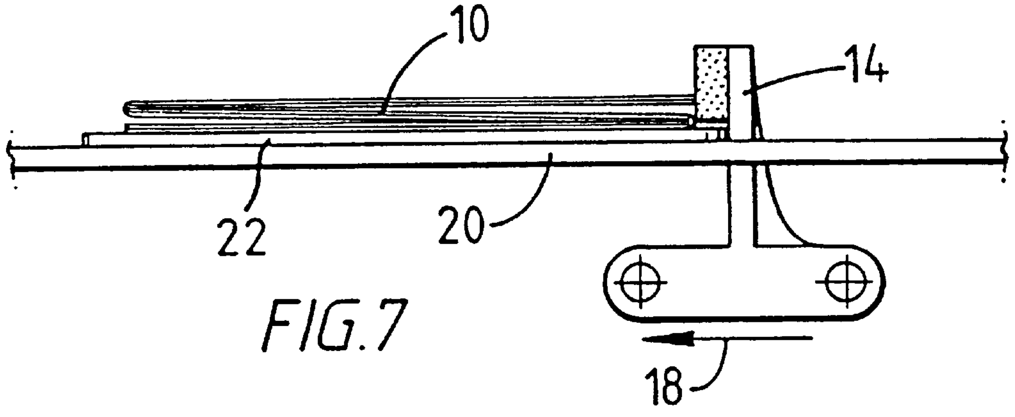
FIG.7
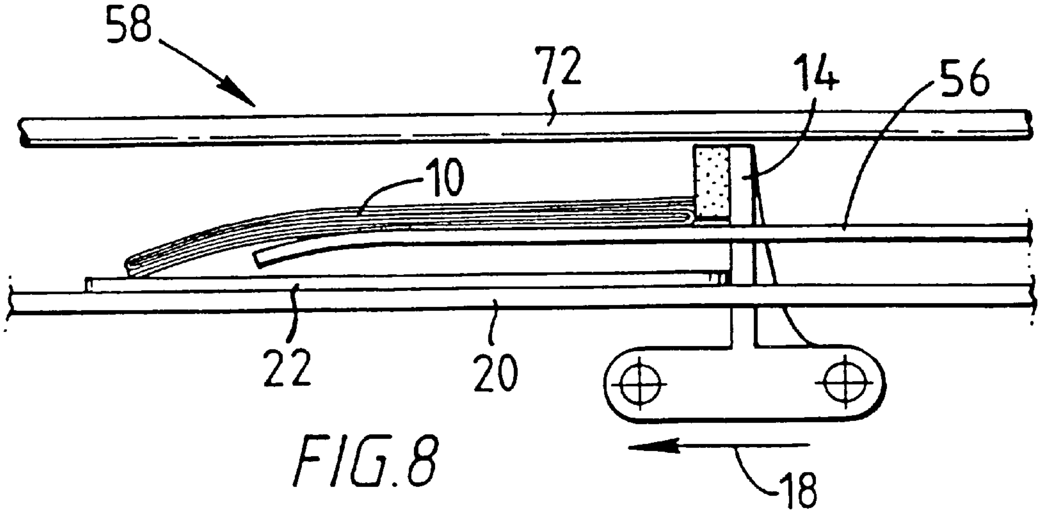
FIG.8

METHOD AND APPARATUS FOR PROVIDING FOLDED SHEETS WITH STIFFENERS

BACKGROUND TO THE INVENTION

FIELD OF THE INVENTION

This invention relates to articles each comprising a sheet folded with a first set of concertina folds and so as to be transverse to these a second set of concertina folds. It also relates to improved apparatus and processes for producing such articles. Certain features or combinations of features of the apparatus and processes are thought to have independent value and the invention therefore extends to such features and combinations and to corresponding articles.

The present inventor has experimented to produce the first-mentioned articles with finishing of them, by attaching outer stiff portions to the folded sheet, being done by hand. In attempting to produce apparatus for carrying out this process and further steps of processing such articles, there have been encountered much inconsistency in production, very slow maximum speeds of production and various other snags.

SUMMARY OF THE INVENTION

After some years of research, the inventor discovered that all of these faults could be attributed to incorrect or inadequate control of the folded sheet being processed and more particularly discovered a need to maintain the sheets folded during such processing or at least certain parts thereof.

Accordingly, one aspect of the invention provides apparatus as claimed in Feature 2 of the accompanying list of Features at the end of this description. It is thought that this can usefully be extended to apparatus as claimed in Feature 1. Particular stages at which it has been found advantageous to maintain the sheet folded are as defined in Features 3 and 4. The sheet may be maintained folded by various means including an air jet or a spring-loaded member but a particularly advantageous arrangement utilises guide means to bear against the folded sheet as defined in Feature 5, which means can also be used as an integral part of handling and positioning means of the apparatus. A much improved product is obtained by use of pinch rollers to consolidate the folds after the attaching step mentioned in Features 1 and 2. The folded sheets being processed may be handled in various ways in the apparatus but the particular apparatus defined in Feature 7 is, according to another aspect of the invention, particularly advantageous in utilising guide means, e.g. as aforesaid. Particularly neat, workable and efficient apparatus is obtained more progressively by each of the further combinations of features defined in Features 8 to 13. Feature 15 defines a particularly successful form of production apparatus. Apparatus according to another aspect of the invention, as defined in Feature 16, and a particularly successful embodiment thereof as defined further in Feature 17, can be used with the foregoing apparatus to improve the speed, consistency and handling of the apparatus aforesaid but could apparently be used in other contexts. Likewise, apparatus according to another aspect of the invention as defined in Feature 19 has been found to obviate snags arising from glue causing folds of the folded sheet to stick together, when used in the aforesaid apparatus but would appear to be useful in other contexts too. In apparatus for attaching elements together, e.g. by gluing, the relative positions of the elements is usually able to be varied within quite large tolerance. However, in the present case, it is found that the articles concerned, being produced in thousands, cannot be packed properly when so produced. Therefore, according to another aspect of the invention, there is provided apparatus as defined in Feature 21, which is especially for use with the aforementioned apparatus but may have other applications. In producing the aforesaid articles, the apparatus can be much improved from the point of view of being able to repair or replace units thereof speedily with minimum downtime if it is embodied in apparatus according to another aspect of the invention as defined in Feature 23, and more successfully with the features defined in Features 24 and 25, but clearly may have other applications. With a view to improving the speed of production of the articles, the aforesaid apparatus can be provided with apparatus according to another feature of the invention as defined in Feature 27 which has particular application to the difficulties of handling and maintaining folded the sheets of the aforesaid articles, but again this can have wider applications. With a view to maintaining the sheet folded in the aforesaid articles once they have left the production apparatus, there can be provided therein apparatus according to another aspect of the invention as defined in Feature 29 and clearly this can have wider application. In order to improve the usefulness of the aforesaid apparatus, it may have stages for further processing, according to other aspects of the invention as defined respectively in Features 31 and 33, which combinations of features again may have wider application. Further and more advantageous stages of such apparatus are defined in Features 34 and 35.

Turning to the actual production of the article, as a possibly faster and quicker and less messy alternative to the fixing of stiff portions to the folded sheet, there may be provided apparatus according to another aspect of the invention as defined in Feature 37 with any of the more detailed features defined in Features 38 to 43. Clearly, such apparatus can have wider application than to the articles aforesaid. The features defined in Feature 42 produce a particularly economical application. The apparatus described can be embodied in apparatus according to another aspect of the invention defined in Feature 45 or the latter apparatus can be used independently thereof, in either case for example to produce a machine that can be coin-fed for the purchaser to be able to select whatever information he requires to be printed on the article produced. Such an apparatus may be made much more useful by having the features defined in Feature 46. The totality of apparatus defined in Feature 47 produces an article which is particularly convenient for use.

According to other aspects of the invention, there is provided apparatus as claimed in Feature 49 or 50 respectively which can be used in the aforesaid apparatus or independently and produces an article that can have other utility by virtue of its perforations.

According to yet another aspect of the invention, there can be provided apparatus as defined in Feature 52, the frames being e.g. positive copies of negative frames in the original film, which can produce a particularly useful article, e.g. by simply replacing the normal set of loose positives by a single sheet having all of the positives in successive or predetermined positions, or by allowing such a sheet to be edited at the stage of taking the photographs by determining the order in which photographs are taken, e.g. for use by estate agents. While such apparatus has particular usefulness in relation to the aforementioned apparatus, it can also be used for other applications.

In accordance with respective other aspects of the invention, there are provided processes as defined in the accompanying Features 59, 61 to 68, 70, 75 to 77, 80 to 82 and 84. According to yet further respective aspects of the invention, there are provided articles as defined in the accompanying Features 88 to 90, 92 to 96, 100,101,103 and 104. As these Features correspond largely to the preceding Features relating to apparatus, advantages of these processes and articles will be apparent.

BRIEF DESCRIPTION OF THE DRAWINGS

Reference will now be made by way of example to the accompanying drawings, in which:

FIG. 5 is a perspective view of a detail of FIG. 4;

FIG. 6 is a side elevation of a flight of the FIG. 4 embodiment;

FIG. 7 is a schematic side elevation of details of the FIG. 4 embodiment just after station 58;

FIG. 8 is a view corresponding to FIG. 7 showing operation of the process at station 58;

DESCRIPTION OF THE PREFERRED EMBODIMENTS

Figures 1, 2, 3:
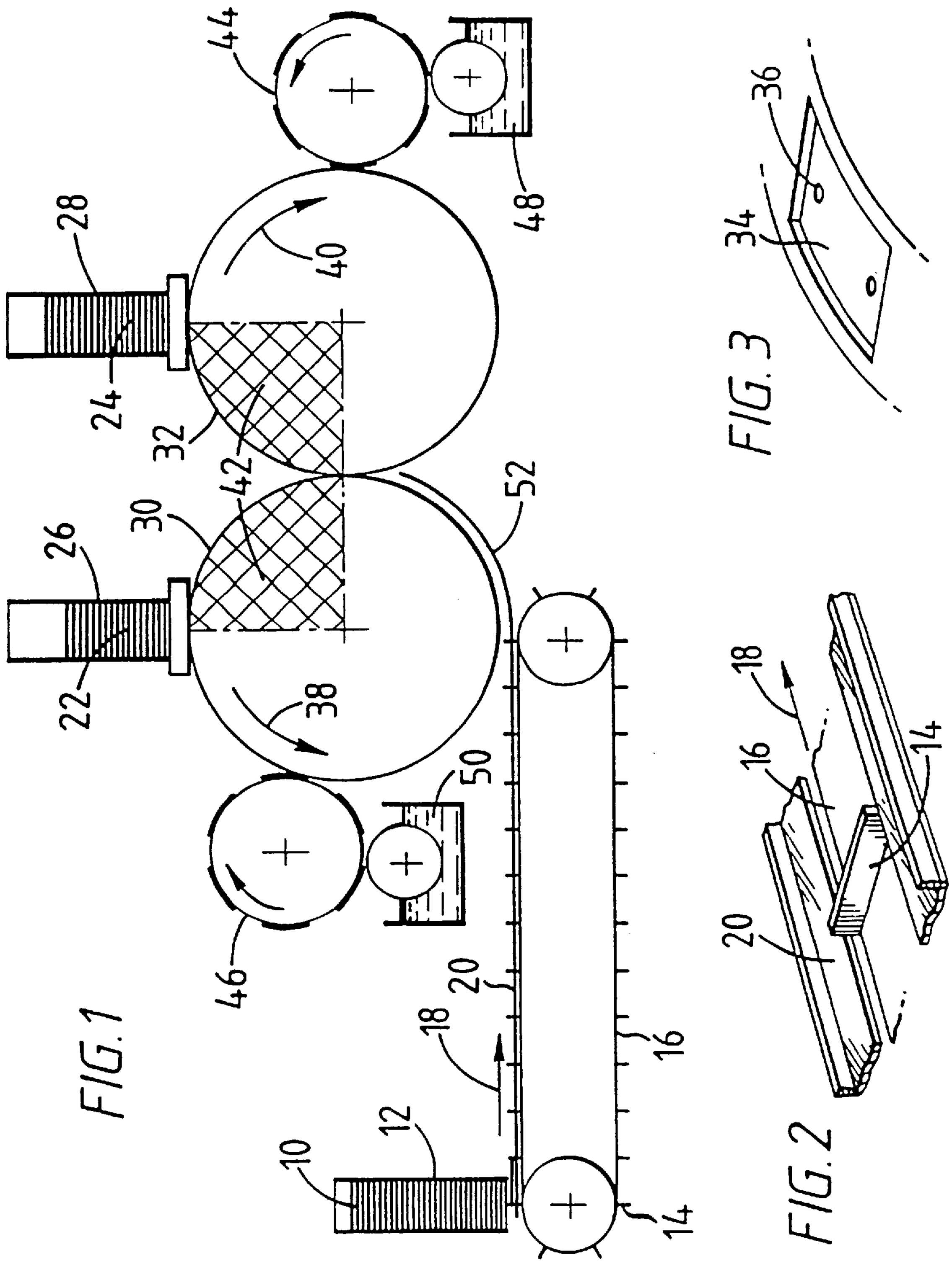
FIG. 1 is a schematic side elevation of a first example of apparatus embodying the invention.
FIG. 2 is a perspective view of a detail of FIG. 1.
FIG. 3 is a perspective view of another detail of FIG. 1.

In one example of apparatus embodying the invention, as illustrated in FIGS. 1 to 3, sheets 10 each folded with a first set of concertina folds and perpendicular to these a second set of concertina folds are fed from a hopper 12, being entrained one at a time from the bottom thereof by flights 14 on a belt 16 moving in the direction of arrow 18, each entrained folded sheet 10 resting on, and being pushed along, guide means 20 in the form of two rails on either side of flights 14, as seen in FIG. 2. Stiff portions 22, 24 in the form of cards of plastics material like credit cards (3.4"× 2.1"=85 mm×55 mm) are supplied from hoppers 26, 28 to drums 30, 32, being taken off one at a time from the bottom of the hoppers by recesses 34, FIG. 3, with the aid of vacuum ports 36. The drums 30, 32 rotate in the direction of arrows 38, 40 and their ports 36 maintain vacuum except in the shaded quarter 42 of their circumference. The drums move the captured single cards past gluing drums 44, 46 supplied from glue baths 48, 50. As a glued card 22 in a recess 34 reaches the bottom of drum 30, it is synchronised with a folded sheet 10 and carries this off the belt 16 along an upward projection 52 of guide means 20, adhering to folded sheet 10. The combination of folded sheet 10 and card 22 glued thereto then reaches the pinch between drums 30, 32 at which it is synchronised with a glued card 24 carried in a recess 34 in drum 40 and at that point the card 24 is attached to the other side of the folded sheet 10. Without guide portion 52 to maintain the sheet folded, the apparatus could work slowly but not reliably and not fast Also, if the apparatus stopped and was then restarted, flights 14 tended to jerk folded sheets 10 irregularly, and inconsistent results were obtained.

An alternative example embodying the invention is shown in FIGS. 4 to 20. The same reference numerals are used for corresponding parts of different embodiments. A bottom card 22 is slid off the bottom of hopper 26 by a flight 14 and carried to a gluer spray head 54 constituting a gluing station by moving along guide means 20. A folded sheet 10 is supplied by hopper 12 to a first upper portion 56 of guide means 20 and is entrained by a flight 14 so that it moves along guide means 20 above a glued card 22. Guide means portion 56 is shaped so that this folded sheet 10 descends as it is pushed along by its flight 14 and eventually meets the corresponding glued card 22 and therefore becomes attached to that at the end of portion 56 which therefore constitutes an attaching station 58. The combination of card 22 and folded sheet 10 attached thereto passes beneath a second gluer spray head 60 at which the uppermost surface of the folded sheet 10 is sprayed suitably with glue and the combination proceeds beneath hopper 28 from which the flight 14 entrains a card 24 resting on a second upper portion 62 of guide means 20 above the combination of card 22 and folded sheet 10 until, due to the shape of portion 62, card 24 descends and meets the combination at a point 64 where it is attached by the last gluing to the said combination, which point 64 therefore constitutes a second attaching station. The resulting article then proceeds to pinch rollers 66. All of the moving parts are driven from a single motive source 68.

Figure 9:
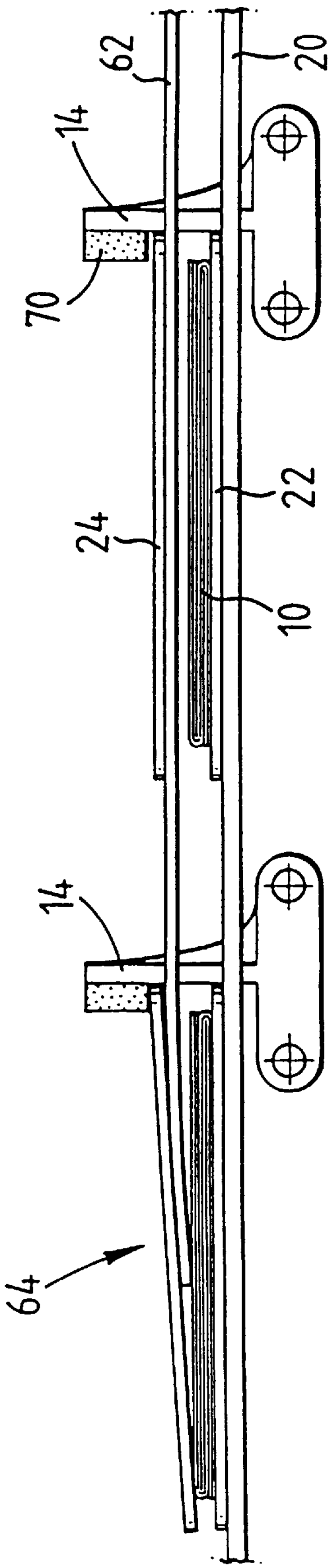
FIG. 9 is a view corresponding to FIG. 8 to illustrate the process at station 64.
Figure 10:
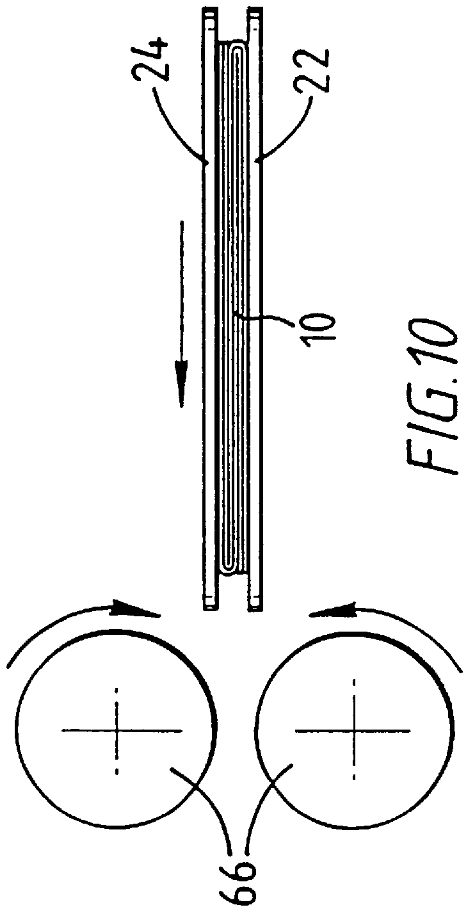
FIG. 10 shows the action at pinch rollers 66.

In more detail, a flight 14 comprises a spacer 70 with a thickness of about 3 mm in the horizontal direction as seen in FIG. 6. This controls the spacing between bottom card 22 and folded sheet 10, e.g. as shown in FIG. 7 which is a view after they have been attached together at station 58, the action at which station can be seen from FIG. 8, which also shows a single central circular bar 72 employed to maintain sheet 10 folded and located just above flights 14 at certain parts of the path along guide means 20 of which bar 72 is a portion. These parts are especially below the spray stations 54, 60 because air comes out from these at quite a high pressure of approximately 40 p.s.i. and would otherwise blow open the folded sheets 10 if it were not for the bar 72 maintaining them folded, for a distance of perhaps 15 cm (6") before and after each of stations 54, 60 and at attaching stations 58, 64, where the change in level and attitude of elements 22, 10, 24 and the contact of folded sheets 10 with cards 22, 24 also might tend to open folded sheets 10 if it were not for bars 72 maintaining them folded. The bar 72 could be extended along the whole path length of the apparatus from hopper 26 to just before pinch rolls 66 but it is considered that more accurate guidance of the elements 22, 10, 24 of the objects travelling along the conveyer means comprising belt 16, flights 14 and guide means 20 for positioning of these elements can be provided by guide means 20 and for maintaining sheets 10 folded. At spray head 54, a pair of nozzles 74, 76, FIG. 16, spray a pair of lines 78, 80, FIG. 14 on card 22 and at spray head 60 a pair of nozzles similarly sprays a pair of lines of glue 82, 84, FIG. 15, onto folded sheet 10 so as to stop short of the edges of the folded sheet 10. As seen in FIG. 9, guide portion 62 is sufficiently lower than spacer 70 of flight 14 for card 24 to be correctly located exactly over card 22 of the combination with folded sheet 10. FIG. 9 then shows how guide 62 goes even lower to terminate at station 64 at which point card 24 meets folded sheet 10 and is attached thereto by the glue lines 82, 84. After a suitable further period (to allow drying) of transport to pinch rolls 66, these consolidate the folds (and gluing) of the article formed of cards 22, 24 and folded sheet 10, see FIG. 10.

Figure 11:
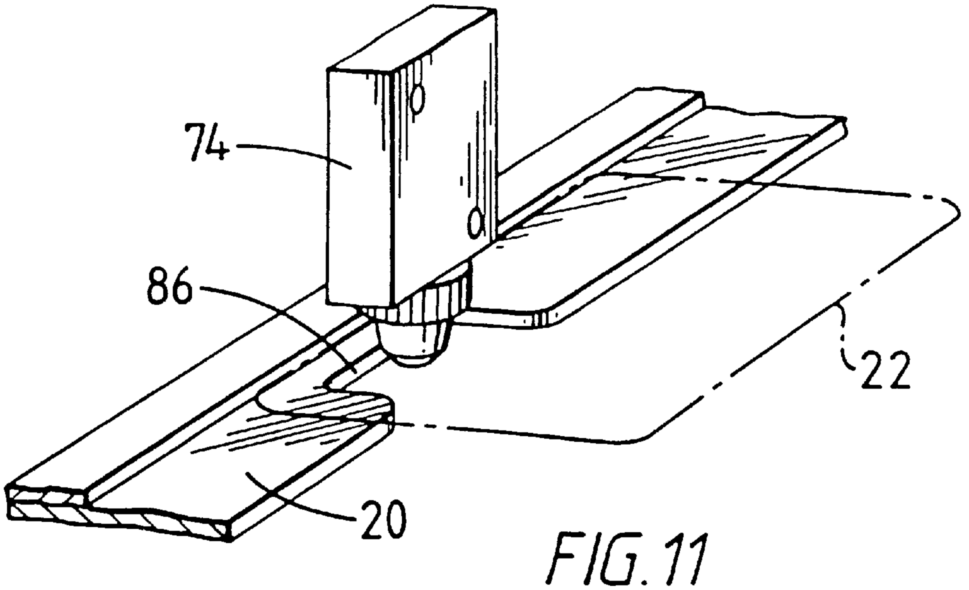
FIG. 11 is a perspective view of a detail of the FIG. 4 embodiment showing how a spray head nozzle cooperates with guide means 20.
Figure 12:
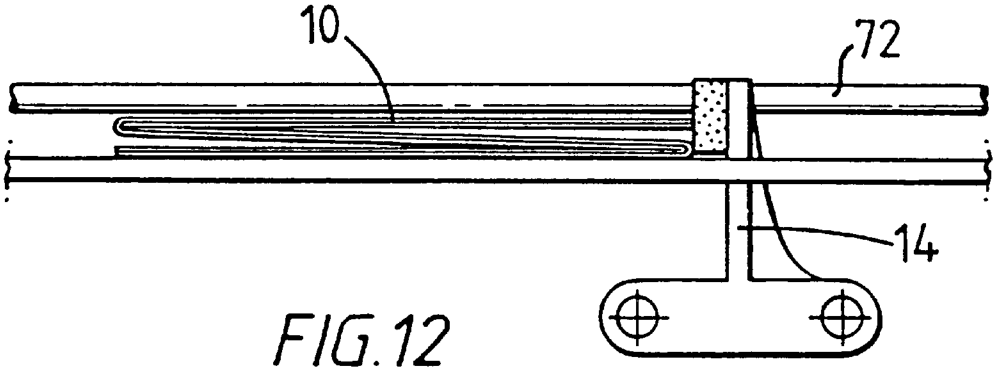
FIG. 12 is a view corresponding to FIG. 8 showing an alternative arrangement of a bar 10 of guide means 20.
Figure 13:
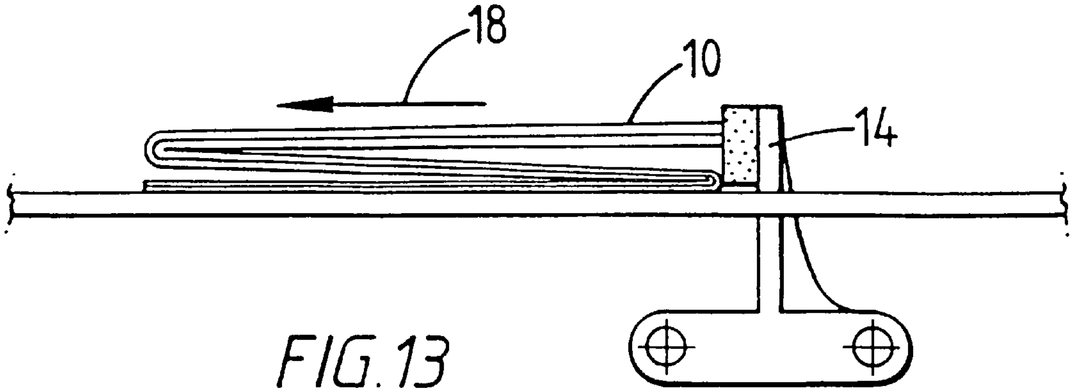
FIG. 13 is a view corresponding to FIG. 12 showing the orientation of a folded sheet 10 in the process.
Figure 14:
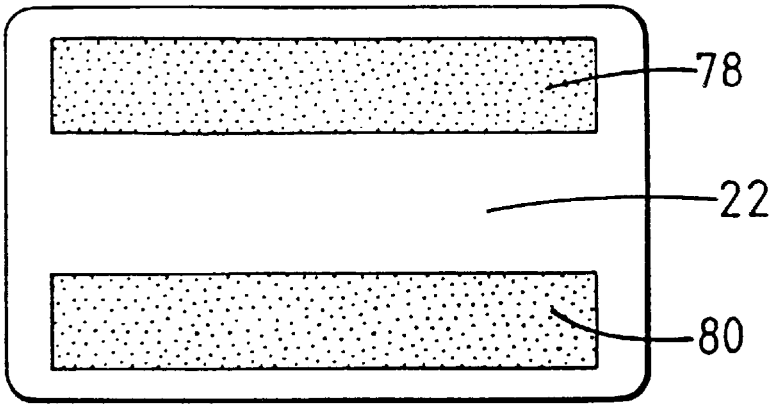
FIG. 14 shows where the glue is applied to a card 22.
Figure 15:
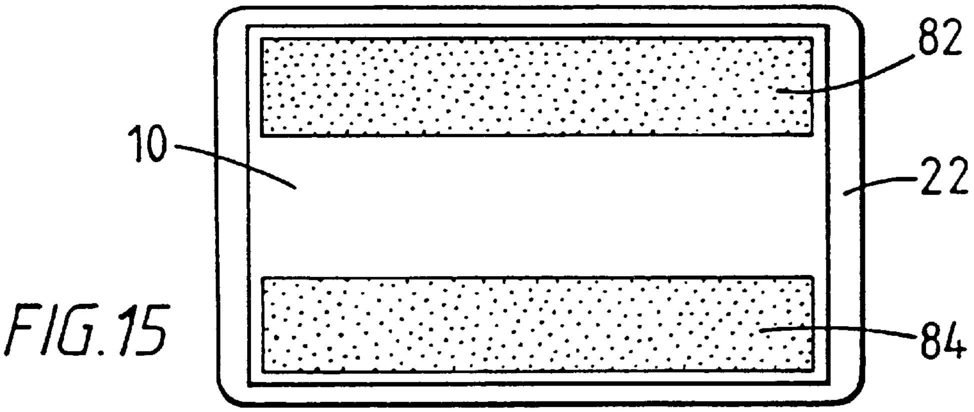
FIG. 15 shows where the glue is applied to a folded sheet 10.
Figure 16:
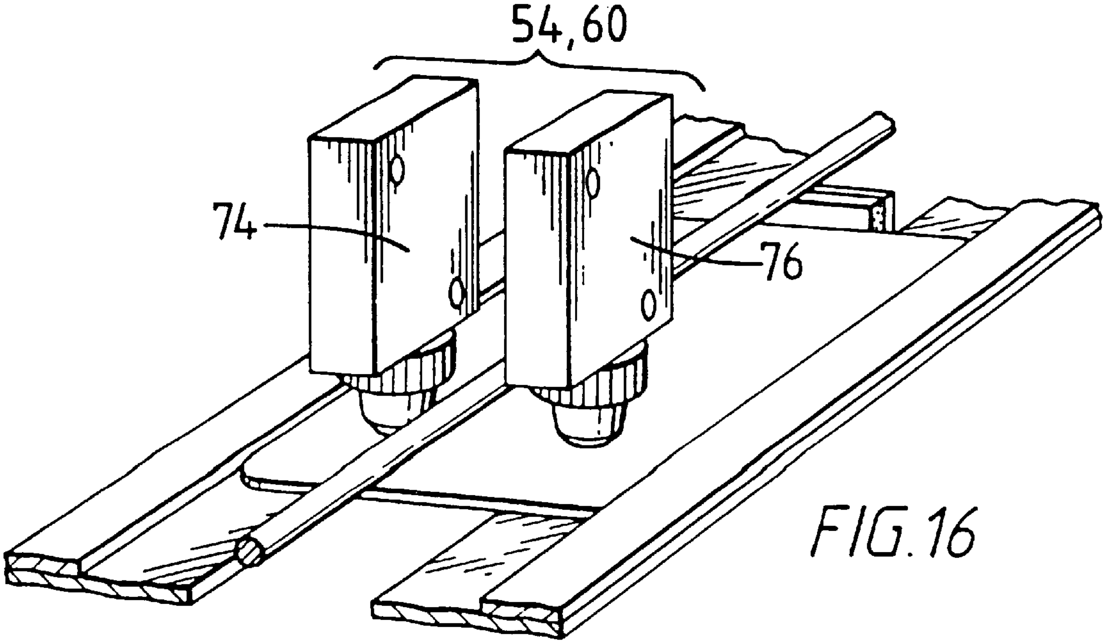
FIG. 16 is a perspective view showing details of the spray heads 54, 60.
Figure 19:
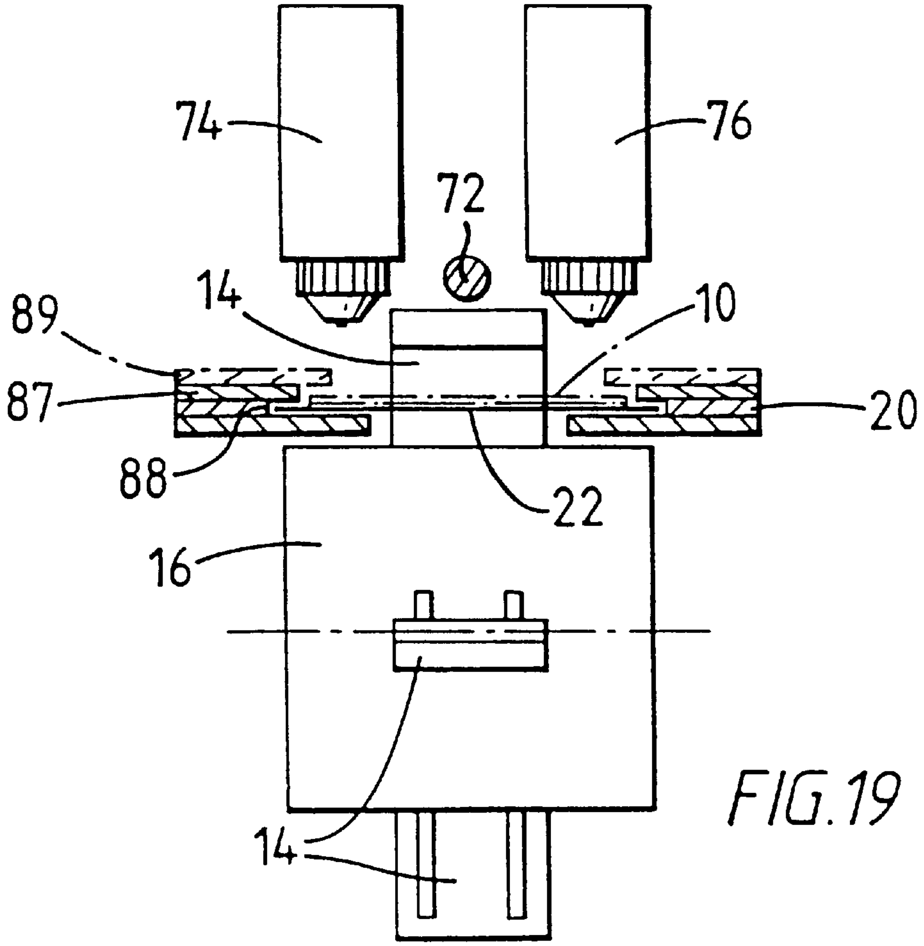
FIG. 19 is a view corresponding to FIGS. 17 and 18 showing in detail an end view of a single channel of the FIG. 4 embodiment.

As seen in FIG. 11, guide means 20 may extend to almost the centre of a card 22 and be provided with a cut out 86 to allow spray to issue from nozzle 74 and reach card 22, and likewise with nozzle 76. FIG. 13 shows the preferred orientation of folded sheet 10 with respect to its second set of folds and its direction of motion 18, in order to reduce its tendency to open due to its forward motion or due to flight 14 hitting its back end if it restarts to move. FIG. 12 shows an alternative arrangement in which the flights have a recessed top centre and bar 72 can then be put lower in order to maintain sheets 10 folded. The preferred method of shaping the lower, As seen in FIG. 19, portion of guide means 20 is to provide a recess 88 at each side so as to maintain sheet 10 folded throughout its path. (For clarity, FIG. 19 does not show lower card 22, which is in fact present below sheet 10.) Alternatively, the recessed shape of the lower portion of guide means 20 may not extend to certain positions at which bar 72 is used instead. In another alternative, item 10, FIG. 19, is replaced by card 22 surmounted by folded sheet 10 shown in dashed lines and an upper part of the lower portion of guide 20 defines a further recess to maintain sheet 22 folded.

Figure 20:
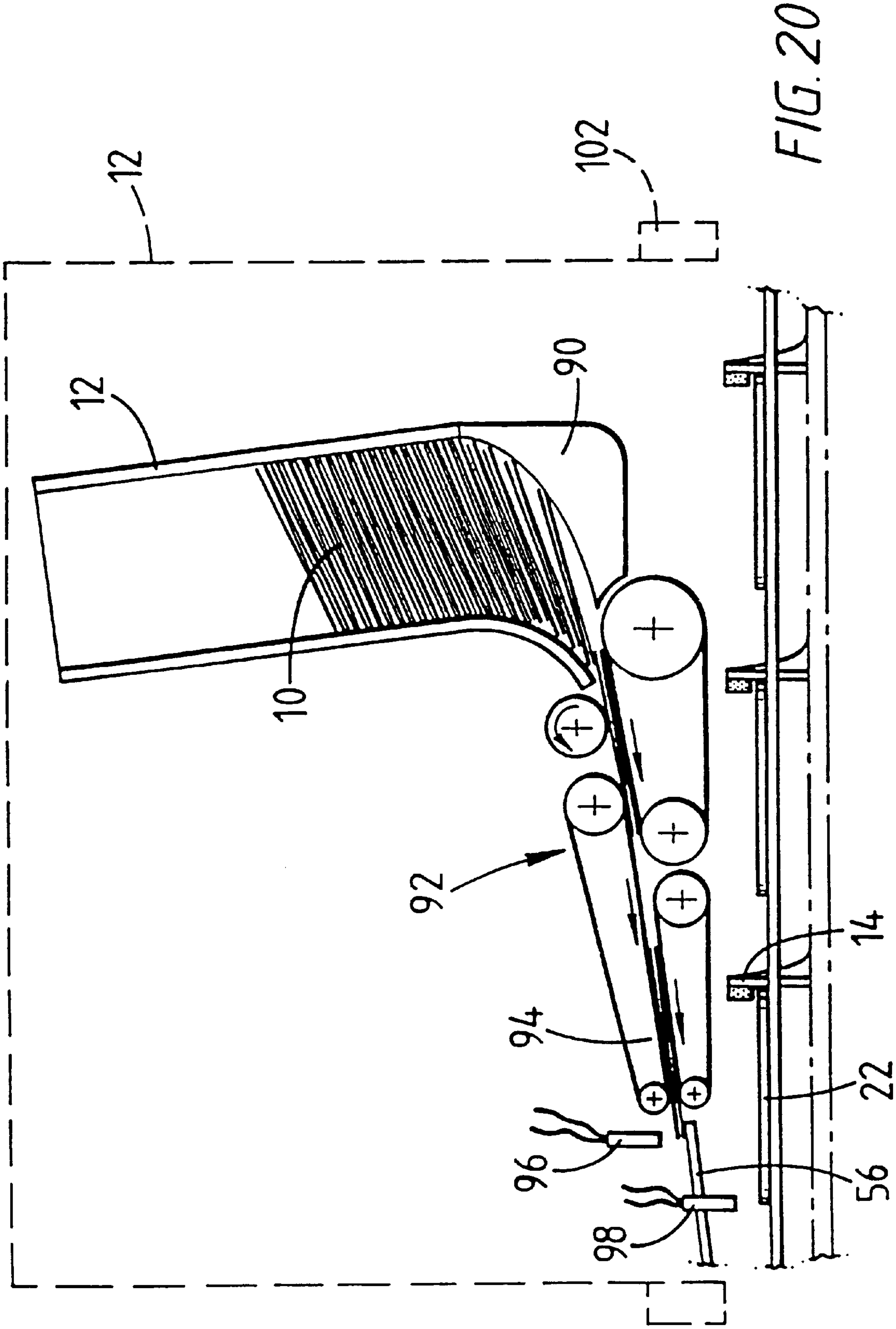
FIG. 20 is a schematic part cross-sectional view of hopper 12 of the FIG. 4 embodiment together with associated delivery mechanism.

FIG. 20 shows details of one arrangement of hopper 12 in which a pile of the cards 10 slide down past a shoe 90 helped by means of roller and belts mechanism 92 moving in the directions of the arrows shown and are presented at position 94 to a sensor 96 cooperating with a sensor 98 sensing the front of a card 22 to start and stop the motion of feed mechanism 92 in order to present sheets 10, accurately positioned in relation to cards 22, to upper portion 56 of guide means 20 to be entrained by flights 14.

Figure 4:
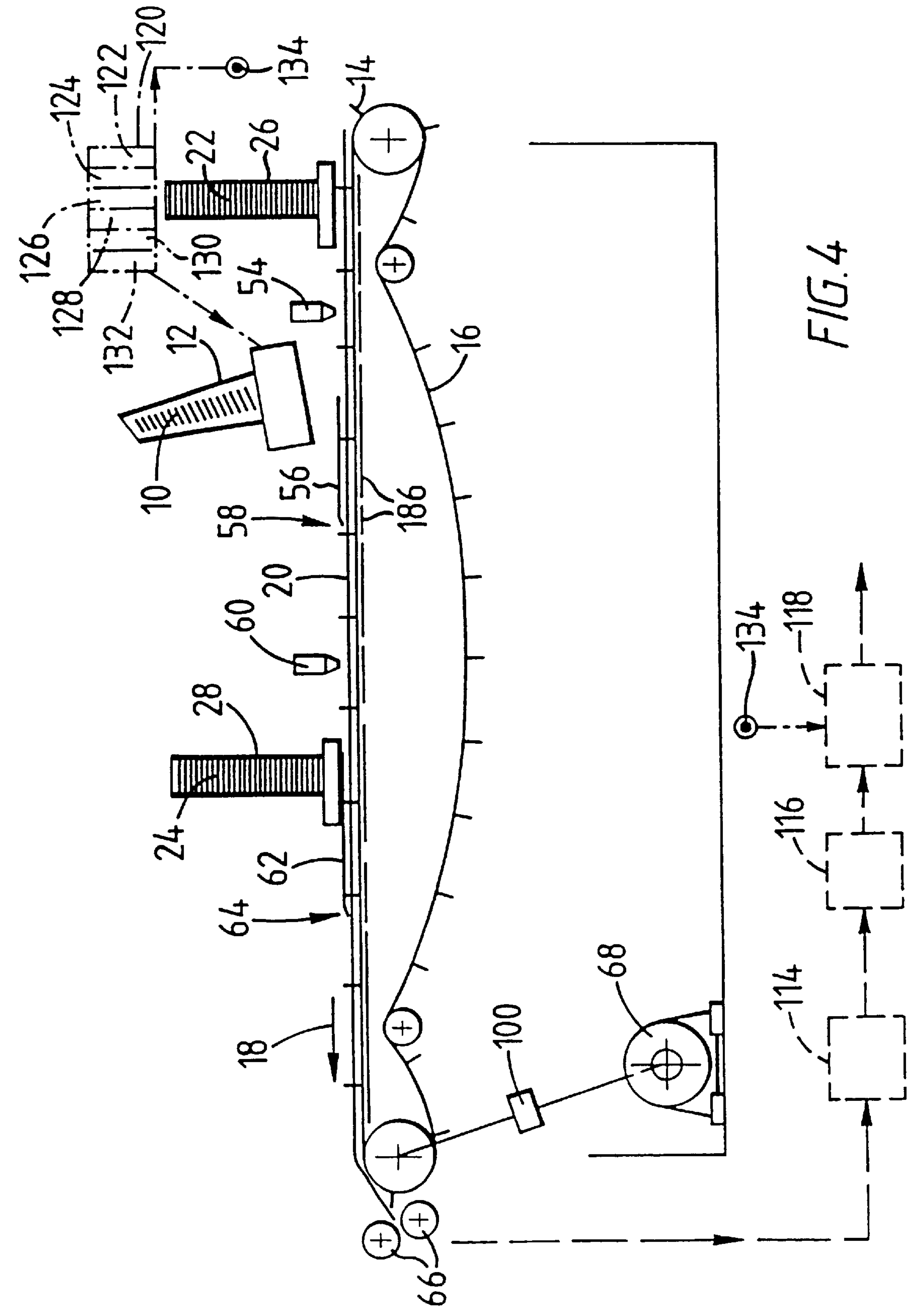
FIG. 4 is a view corresponding to FIG. 1 of a second example of apparatus embodying the invention.
Figure 17:
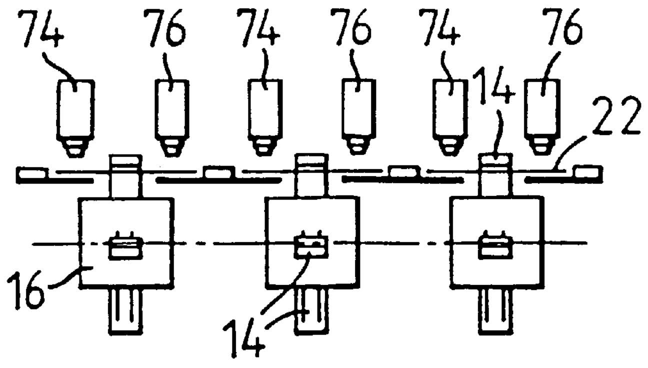
FIG. 17 is an end view of a three-channel embodiment corresponding to FIG. 4.
Figure 18:
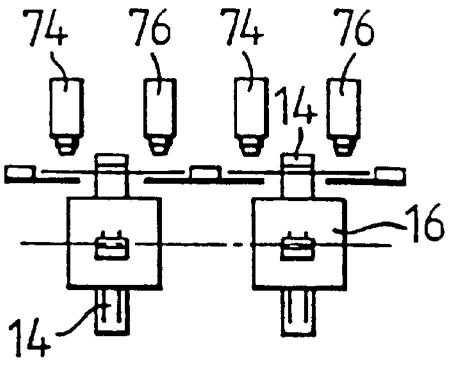
FIG. 18 is a view corresponding to FIG. 17 of a two-channel embodiment corresponding to FIG. 4.

While FIG. 4 shows one channel, there may be a plurality of channels, for example two as shown in FIG. 18 or three as shown in FIG. 17, each channel having substantially the appearance shown in FIG. 19. The various channels may be operated from a single motive source 68, FIG. 4, with means 100 to switch it off from each channel independently and each of the various units, e.g. hopper 12 with its associated mechanisms, FIG. 20, has quick release means 102 enabling it to be unplugged and quickly removed for repair or replacement.

Figure 21:
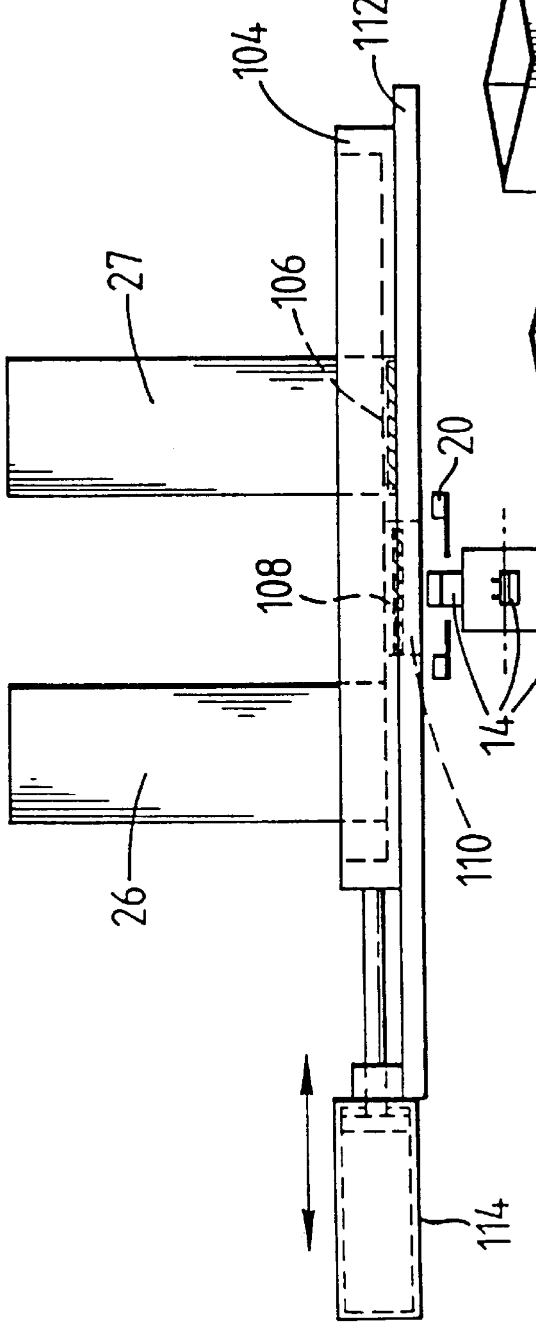
FIG. 21 is a schematic view of a reciprocating mechanism operable with hopper means such as 26, 28, seen as an end view corresponding to FIG. 19.
Figure 22:
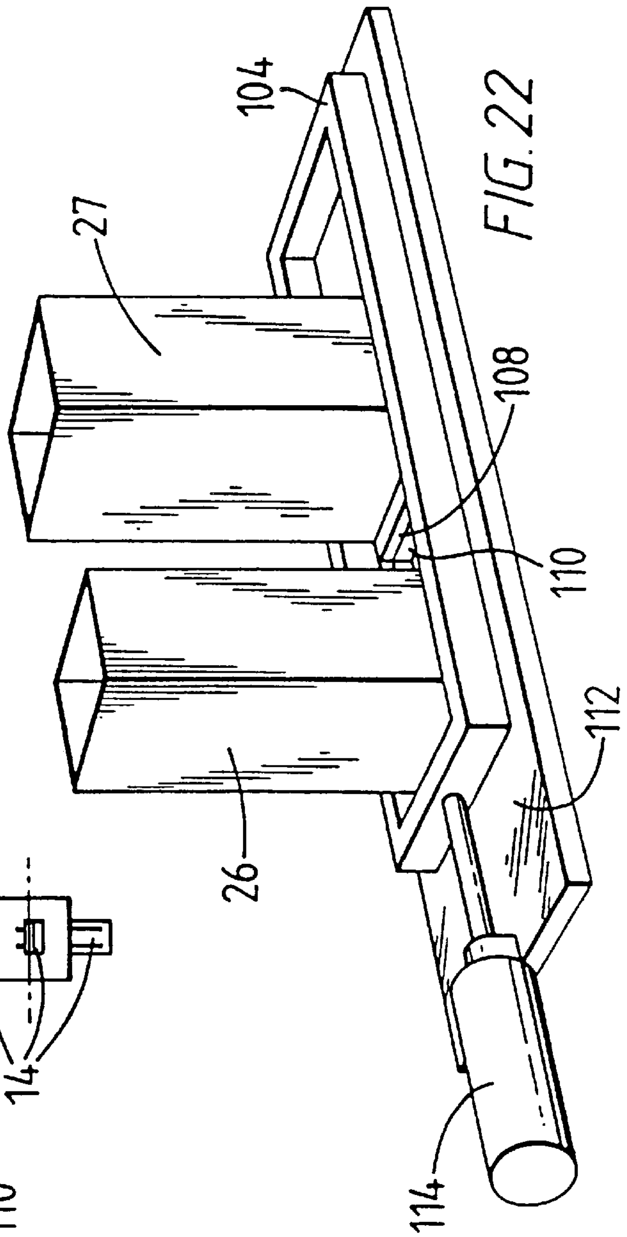
FIG. 22 is a perspective view of the reciprocating mechanism shown in FIG. 21.

As seen in FIGS. 21 and 22, supply means for cards 22 or 24, e.g. shown as hoppers 26, 27, are arranged to include means to reciprocate and supply cards alternately from each store 26, 27. Such supply means have a supply member 104 with two recesses 106, 108 each able to take a single card 22, arranged to reciprocate between a first position in which it is adapted to receive a card from store 27 (as shown in FIG. 21) in recess 106 and supply a card 22 from the other recess 108 to a take off point (in the form of a gap 110 in a stationary member 112), and a second position at which it is adapted to receive a card 22 from the other store 26 in the other recess 108 and supply a card 22 from said one recess 106 to said point 110 over which recess 106 is located in said second position. The member 104 is reciprocated by means of a pneumatic cylinder 114.

The action of the pinch rollers 66, FIG. 4, serves also to apply a firm pressure for a short period to ensure a good bond due to the glue and to reduce any tendency for the folded sheet insert 10 to wrinkle or bubble. It will be apparent that the ways in which the various processes are carried out can be varied widely to make use of proprietary/known equipment or equipment specifically devised for the purpose. For example, the cards 22, 24 and inserts 10 can be stacked, e.g. manually, between vertical or horizontal guides and fed into the apparatus shown in FIG. 4 or onto another feeder feeding into this apparatus by the use of belts and rollers. Again, they may be fed by use of vacuum means, reciprocating gates or rotary drums. The cards 22 and folded sheets 10 (which might for example be maps) may also be fed into the apparatus by hand. The glue can be applied to any or all of the insert 10 and cards 22, 24. The glue can be water based, solvent based, hot melt or any other suitable material and can be applied by roller, spray bar, spray nozzle, ball tip, slot coat, screen print or any other suitable device. Either cards 22 or cards 24 may be omitted. Transport of cards 22, folded sheets 10, and assemblies thereof, through the process can be effected using plain or flighted belt conveyers, conveyers with applied air suction, rollers, or by the use of a rotating drum or carousel. A "pick and place" mechanism can also be used. Any such devices can be used alone or in combination. The cards 22 and inserts 10 may be located on runners, belts or rollers, in pockets or by any other suitable devices. They may be restrained from upward and/or sideways motion by means of runners, bars, belts, rollers or any other suitable alone or in any combination. In place of pinch rollers 66, there may be used a reciprocating press platten, pinch belts, air pressure or suction on a foraminous belt or table and/or by any other suitable means. Pressure for the purposes mentioned in connection with rollers 66 may be applied at this point alone or may be applied after station 58 and again after station 64. Overall control of the process can be by means of a single overall programmable logic controller, or a series of controllers, one for each operation. Information for such controllers can be based on the movement and position of the cards 22, 24 and inserts 10 or any other moving unit or other machine component (e.g. the flights 14) and can be collected using any proprietary/known sensing device which may be either a contact or a non-contact variety. Alternatively, a completely integrated mechanised system can be devised using any of the above features, as will be apparent to one skilled in the art. Equally, a completely different process can be devised based on pre-coating of cards 22, 24 and inserts 10 with a suitable bonding agent which is activated after assembly together of the elements 22, 24, 10 using heat, pressure, radiation or otherwise. Again, there can be used a two-component adhesive system, with one component on each of the elements to be attached together, the components crosslinking together to provide the required attachment. It may be possible to pinch, activate or otherwise process two or more, e.g. a stack, of the articles together.

It should be noted that the width (in the horizontal direction seen in FIG. 6) of a spacer 70 is half the difference in length between a card 22 and an insert 10 for symmetrical mutual relative displacement thereof in the forward direction. However, this may be altered if an asymmetrical arrangement is required. An extra function of slot 86, FIG. 11, is to allow excess adhesive to drop through. The position of the object along its path is detected by sensors (not shown) which, for example, switch on spray-carrying air to spray-heads 54, 60 just before arrival of the object and switch it off just after departure thereof and, by timing or position-sensing, switch on the supply of glue for the right period to start and stop short of the leading and trailing edges of the folded insert 10, both at spray head 54 (where it is pre-calculated where the insert 10 will lie) and at spray head 60. One example of the whole apparatus shown in full lines in FIG. 4 is about 3.5 metres long and the objects travel at about two per second with a pitch (interval between flights 14) of 125 mm. The glue is chosen so that, at the resulting speed of the objects, the glue will quickly become tacky and avoid slippage of the various elements of the object by the time they pass through pinch rollers 66, which run approximately 20% faster than the conveyer flights 14. The inserts 10 shown are Z-shaped in respect of their second set of concertina folds, as seen in a direction looking at FIGS. 4 and 13, with a fold line uppermost and foremost. This orientation allows the extra weight at the top front to help maintain the insert 10 folded, it gives a smoother passage through the runner system which guide means 20 comprise, and rt aids feeding from hopper 12, especially when this is provided with the details shown in FIG. 20. Speeds on this apparatus to produce one article per second or more are considered to be high speeds, at which the process is enabled or substantially improved by maintaining the folded sheets folded. It will be appreciated that the apparatus described is capable of ready adjustment to accommodate different thicknesses and size of cards 22, 24 and inserts 10, as well as different relative positioning therebetween.

The full-line embodiment of FIG. 4 may be extended as indicated by the schematic, flow diagram type, dashed lines, in which means 114 serve to enclose the article received from pinch rollers 66 in an envelope, for example by flo-wrapping the object in polypropylene from a reel, either as a sleeve or as an envelope e.g. formed from the sleeve crimped closed at both ends. The article may then pass to means 116 for attaching it removably adhesively to another sheet, already or subsequently bearing information, e.g. a compliments slip, and may then pass to yet other means 118 to put the object emerging from means 116 into an envelope and provide from a mailing list stored in means 118 selected addressee details on the outside of the last envelope or on the compliments slip visible through a window in such envelope. Alternatively, means 114 may function directly as just described of means 118 to provide a mailing envelope directly enclosing the article emerging from pinch rolls 66.

In a further possibility, shown in chain-dotted lines in FIG. 4, means 120 serve to store unfolded sheets 10, store information, select among the stored information (e.g. in response to a keyboard input) print a sheet with the selected information, fold the sheet with the necessary concertina folds and expel the same in the same manner as hopper 12. The full-line features of FIG. 4 then provide stiff portions to the folded sheet 10. The means 120 may be specifically adapted to fold the sheet with both a first set of concertina folds and at right angles to these a second set of concertina folds and the full-line features of FIG. 4 can then attach a stiff portion 22, 24 to each of the two opposite outer segments of the folded sheet. Any of means 114, 116,118 may also be included.

The flights 14 are stepped by means of spacers 70, FIG. 6, but could be stepped in other configurations for other purposes, e.g. to provide cards 22, 24 mutually relatively displaced along the direction of travel. Whatever the requirement, a suitable combination of guide means 20 and flights 14 can be designed. As explained, particularly with reference to FIGS. 8 and 9, the guide means 20 are shaped to vary the position (vertically) of each object comprising one or more of cards 22, 24 and an insert 10 relative to the flights 14 during the movement along guide means 20. The flights 14 control the mutual relative position of a sub-assembly of a card 22 and insert sheet 10 and a further separate element in the form of a card 24 during such movement. The guide means 20 comprise a first introductory guide portion (the right hand end of means 20 as seen in FIG. 4) for the first element 22, a second introductory guide portion 56 for the second element comprising a folded sheet 10, these portions being constructed and arranged to allow said flights 14 to entrain such elements separately and then enable them to meet at station 58. Guide means 20 comprise a third introductory portion 62 for a third element comprising card 24, the portions being constructed and arranged to allow the flights 14 to entrain the third element 24 separately from the first and second elements 22, 10 and, after the meeting of said first and second elements at station 58, to enable a meeting at station 64 between the sub-assembly comprising these first and second elements 22, 10 on the one hand and said third element 24 on the other hand. These first, second and third portions of guide means 20 constitute runners along which the elements run when pushed by flights 14. These runners position stiff portion 22 at an upper position adjacent the nozzles of spray gluer 54 to be firstly glued thereby and thereafter lower stiff portion 22 to the level of the lower portion 71, FIG. 6, of flight 14. An upper portion of second runner 56 receives said folded sheet 10 at the level of the upper portion 70 of flight 14 and lowers the same at station 58 to contact the firstly glued upper surface of the first stiff portion 22 while the latter is still positioned by the upper portion 70 of said flight 14, and a lower continuation of the guide means 20, still forming part of the said second runner, passes the folded sheet 10, maintained folded and attached to the first stiff portion 22, close to the nozzles of spray gluer 60 to be secondly glued thereby, and thereafter lowers the sub-assembly comprising the sheet 10 and first stiff portion 22 attached together so that this sub-assembly is wholly within (the height of) the lower portion 71 of flight 14. Third runner 62 is arranged to receive a second said stiff portion 24 and, at station 64, lower the same to the level of the lower portion of said flight to contact the secondly glued surface of said folded sheet 10.

In the course of movement of the folded sheet and stiff portions along the path defined by guide means 20, in FIG. 4, means 87, 88, 89, FIG. 19, (which guide means 20 comprise) due to their shape and arrangement service to maintain predetermined lateral relative positions between the folded sheet 10 and stiff portion 22 while attaching them together and flights 14 maintain predetermined longitudinal relative positions between the same while attaching them together, whereby the same predetermined positions for all of the articles produced are repeated with considerable accuracy.

By suitably constructing and arranging rollers 66 and means 114, 116 and 118, these means serve to maintain the sheet 10 folded while means 114 provide a separate envelope or sleeve around the folded sheet 10 that will maintain the same folded and/or while the means 116 attach sheet 10 to another sheet and/or while means 118 provide a mailing envelope around the folded sheet 10 and provide to the combination details of an addressee suitably visible for postal purposes. Means 120 may comprise as standard industrial units separate means to store unfolded sheets 10, store relevant information to be printed thereto, input a selection among such information, print the selected information to said sheets, fold the printed sheets, and expel them to guide means 20, these being indicated respectively as units 122, 124, 126, 128, 130, 132. Apparatus comprising means 120 together with means 114, 116, 118, may be used with an alternative to the apparatus shown in FIG. 4 in full lines, namely comprising a guide means 20 to receive the expelled folded sheet 10 from means 132 and spray means 60 adapted to spray not glue but a coating for impregnation of the upper outer segment of the folded sheet and means 28 could then be not a hopper but curing means for said coating or impregnation. Means 60 and 28 would then, if desired, be effective on both the upper and lower outer segments of the folded sheet expelled from means 132. Alternatively again, means 60 could be omitted and means 28 could be such as to provide lamination of said upper and/or lower outer segments of folded sheet 10. It may yet again be desirable for such coating or impregnation to be printed onto unfolded sheet 10 by means 128, preferably to stiffen a portion only of said sheet which, upon folding by means 130, will be one or both opposite outer segments of the sheet 10. Means 128 may instead also effect the curing to harden such portion. Alternatively again, means 126 may effect lamination to stiffen a said portion of said sheet which portion, after the folding, will comprise the opposite outer segments thereof. In all such cases of stiffening, the essence of the process is to add matter which is itself non-stiff but, in cooperation with the sheet (e.g. in laminating) or upon curing (after said coating or impregnating) such matter together with the sheet is effective to stiffen the same at a relevant portion only thereof, comprising the two opposite corner segments of the sheet. While lamination of a whole sheet is known and stiffening by coating and impregnation have previously been proposed by the present inventor, it is believed that any such stiffening of a portion only of a sheet (whether folded or not) is novel and inventive. Throughout this specification including the appended claims, the term "stiffening" is intended to refer to such use of a non-stiff material to produce eventually stiffening of the sheet and use of the term "stiff portion" is intended to refer to a portion which is itself stiff and stiffens the sheet by attachment thereto, e.g. by means of glue (which term itself is intended to refer to any suitable adhesive) unless the context otherwise requires.

In a further alternative to the function of the means 120 already described, such means may comprise means 122 to store sheets, means 124 to view individual frames from a strip or the like of film, laser printer means 128 including any necessary features to receive and locate images from said individual frames, and optionally means 130 to fold the sheet with mutually perpendicular concertina fold lines separating said images on said sheet and optionally the full-line features of the FIG. 4 embodiment to attach stiff portions to opposite outer segments of the folded sheet while maintaining the sheet folded, possibly with the addition of any of means 114, 116, 118 and possibly a connection 134 between means 124 and means 118 in order to transmit and enclose the strip or the like of film in the envelope with the printed sheet and possibly together with charging documentation, advertising material and/or fresh (unexposed) film. The term "strip or the like of film" is intended to include, but not be limited to, film cassettes or sequences of film frames around the circumference of a flat circular card of indeed any other format in which frames are contained in a predetermined order.

The use of stiff portions comprising material that is at least partly transparent in any of these processes enables the number of steps to be reduced by omitting at least a step of printing such transparent material since the substrate formed by the sheet 10 thereat can have the necessary information on it This allows such processes to be more economically and simply automated and likewise the corresponding apparatus.

Figure 23:
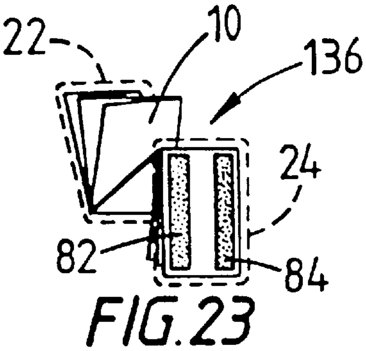
FIGS. 23–30 show examples of articles made embodying the invention.
Figure 24:
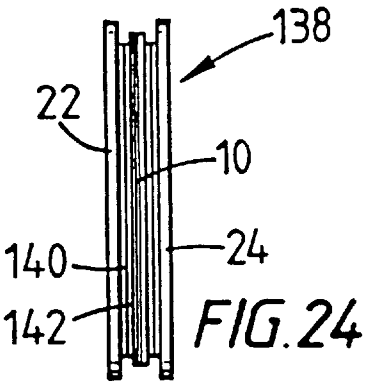
Figure 25:
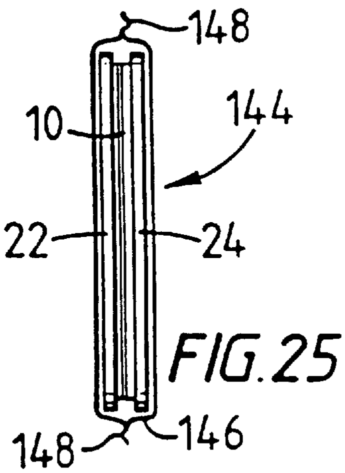
Figure 26:
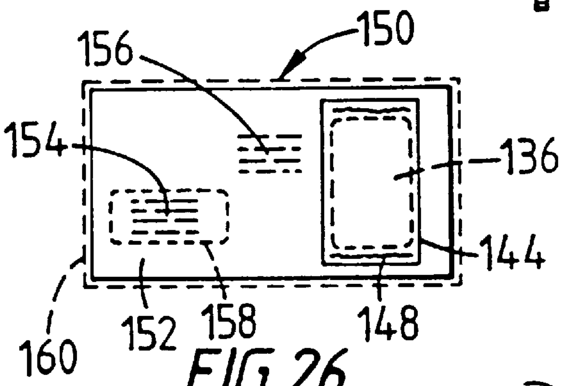
Figure 27:
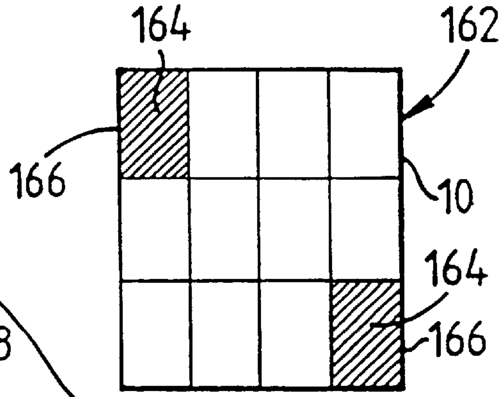
Figure 28:
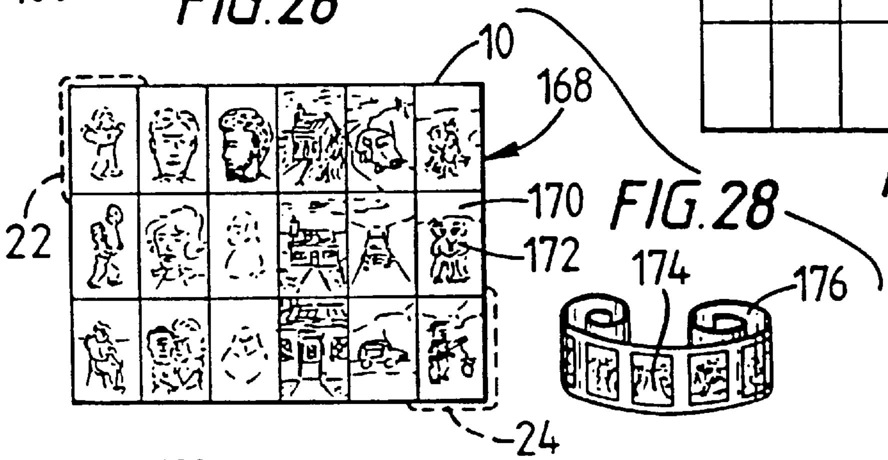
Figure 29:
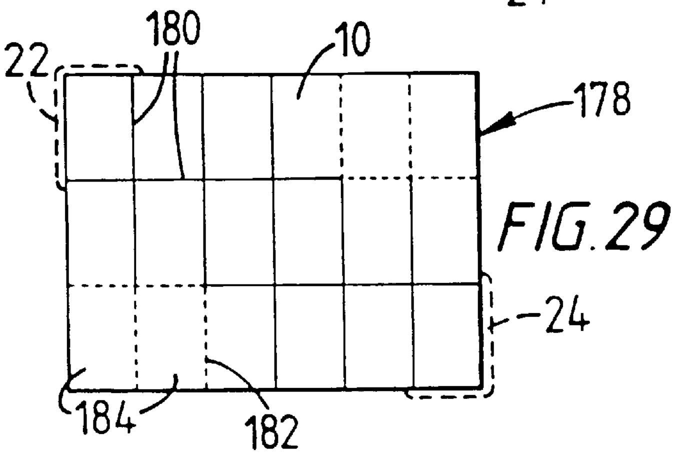

In the article 136, shown partly unfolded in FIG. 23 for the sake of clarity, to which the inventor first turned his attention, it is to be noted that this has an odd number of concertina fold lines longitudinally and an even number of concertina fold lines across its longitude and the adhesive is in an area 82, 84 that stops short of all edges of the folded sheet 10. In the article 138, FIG. 24, the attachment is with the aid of an adhesive system comprising two components 140, 142, one on each of the folded sheet 10 and the stiff portion 22, cross-linked together. In the article 144, FIG. 25, there is a separate envelope 146 in which the sheet 10 (and in this case cards 22, 24) is contained in order to maintain the sheet 10 folded due to the envelope being sufficiently small and/or stiff. If the envelope 146 is not crimped together as shown at the ends 148, it constitutes simply a sleeve. In the article 150, FIG. 26, an article 144 is attached to a sheet comprising a compliments slip bearing information in the form of addressee details 154 intended to show through the window 158 of a window envelope 160 suitably visible for postal purposes and perhaps other descriptive or advertising information 156. Stiff portions 22 and/or 24 and/or envelope 146 may comprise transparent material. Article 162, FIG. 27, comprises a sheet 10 folded with concertina folds (but shown opened out for clarity) and having stiffening of a portion 166, 166 only of the sheet 10 by means of addition thereto of non-stiff matter 164 in the form of lamination or hardened coating or hardened impregnation 164. Article 168, FIG. 28, comprises a sheet 10 having a first set of five concertina folds and perpendicular to these a second set of two concertina folds with the segments 170 thus defined of the sheet 10 bearing laser-printed copies 172 of respective individual frames 174 of a strip 176 of film, the sheet 10 being provided with stiff portions 22, 24 which are transparent so that there can be a total of thirty-six images 172 on the front and back segments together, corresponding to the number of frames on a standard thirty-six exposure film. The images 172 are arranged in the same order as on the film 176 so that, to provide serially related sets of images, as shown along each row in FIG. 23, it is only necessary to take them in the corresponding order on the film 176. To produce article 168, there may be used colour laser-printer means 124. In article 178, FIG. 29, (shown for clarity unfolded, as also article 168), at least a part 182 of the mutually perpendicular sets of lines 180 of the concertina folds is perforated so that segments such as 184 (e.g. constituting discount vouchers) can be detached while still allowing concertina folding action of the remainder of the sheet 10.

In article 136, the number of folds in either or both directions may vary, as also the area and/or arrangement of adhesive, and even whether adhesive or other joining is used for the stiffening, and/or other stiffening means are used.

An article such as 136 has particular advantages in that it can be opened fully, very quickly and easily and possibly using only one hand and can also be refolded very quickly and easily. As mentioned, the production by machine of such articles occasions great difficulties and some of the features herein described for overcoming these difficulties can have other applications.

It is sometimes found that the folded sheets 10, when obtained from an outside source, are not flat but bowed. In such case, a suitable form of guide means 20 can be used to flatten the folded sheets 10 sufficiently for them not adversely to affect the process being carried out by the apparatus of FIG. 4. The features which enable guide means 20 to maintain sheets 10 folded can serve also maintain folded sheets 10 flat. The difficulty arises mainly If the folded sheets 10 are bowed from end to end, in which case a shape of guide means 20 such as shown in dashed lines at 87, 88, 89 in FIG. 19 will be effective to flatten them.

While the addressee details may be provided on the folded sheet 10 or stiff portion 22 or 24 in order to show through a window of envelope 160, these details may alternatively be printed direct to envelope 160, or preferably to an adhesive label affixed by means 118 to envelope 160 as item 158. This particularly facilitates speeding up production since the printing of addresses direct to sheets 10 is much slower than to sheets 152 or to labels. It might only be advantageous to have printing means 124 print also the addressee details if the printing on sheets 10 varies from one sheet 10 to the next, depending on the addressee. Means 114 or 118 may comprise, foradding addressee details, security coding or the like, an ink-jet printer controlled by a tachogenerator to ensure that it prints at the correct position on each article. Alternatively, means 60 may alternatively be a printer or there may be a printer in a similar position above an appropriate part of guide means 20, either at the position shown of means 60 or, for example, just after station 64.

While, as shown in FIG. 4, the upper part of belt 16 with its flights 14 is arranged to move strictly along the level, e.g. by means of a supporting bed under the upper part of belt 16, any adjustment to the flights would need to be carried out on each one individually. A more sensible arrangement is to provide variable height means 186 set into the table at appropriate portions thereof. This also avoids any need to adjust the guide means 20.

Reference above to maintaining sheet 10 folded includes reference to preventing it from opening more than an amount which Is unimportant in the circumstances.

Figure 30:
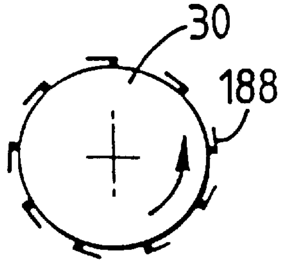

Further methods of maintaining the sheet 10 folded include use of a gravity-operated member or again hook means 188, FIG. 30, exemplified as being provided on a transport drum 30, eg. for use in the FIG. 1 embodiment. Of course, any combination of fold-maintaining means may be employed.

Thus, it will be seen that a universal production apparatus, or at least finishing machine, can be provided which can be readily and speedily adapted to provide any combination of a wide variety of the various optional features mentioned, and adjustments of them.

The information which may be selected by the user via means 126 may, for example, be a highlighting of the positions of all cinemas, car parks or other sites of interest on a map. In a development of means 120, Its means 122 are adapted to store stiff portions such as 22, 24 and its means 132 are adapted to expel two of said stiff portions separately with the folded sheet 10. Such an arrangement is not followed by the full-line features of the FIG. 4 embodiment and may be useful, for example, in a free-standing machine at an airport which produces a map with selected details to order and is coin-freed, its output being the folded sheet and two stiff portions which may be self-adhesive or bear a component of a two-component adhesive system of which the other component is borne by the folded sheet 10, for the user to affix said stiff portions himself to said folded sheet to produce an article 136. The apparatus may alternatively expel a said sheet without folding it, leaving it to the user to fold it. Usually, the user will then simply peel a backing layer off the stiff portions and then attach them to the sheet.

Regarding the use of at least partly transparent stiff portions or cards 22, 24, the following points should be noted:

1. The use of such a card enables all of the printing to be done on the sheet and none, or perhaps only standard information or design, on the card, which cards can then be used without change for a variety of different jobs.

2. Machines to print onto plastic card are very limited in the number of them available and their total capacity, so that large runs need months of advance booking.

3. Plastic cards are normally printed 56 cards to view, i.e. printed at once, in order to provide economic production but this is very expensive on artwork since it then requires a layout with 55 repetitions of the artwork of a single card.

4. Printing done onto plastic quickly becomes scuffed in normal handling, but artwork printed onto the sheet itself is protected by a transparent cover (the card) and therefore use of this produces a functionally better-looking product.

5. Plastic cards when printed are not readily stackable because of drying time and other factors, e.g. scuffing. To stop scuffing requires lamination of the printed plastic cards and such lamination too needs time to dry. Thus, printing onto plastic cards is very slow.

6. If cards having different artwork are printed at the same time on a sheet before cutting, they tend to become mixed up when the sheets are cut up and are difficult to sort.

7. If the folded sheets 10 are obtained externally, the folded sheets in a stack sometimes have different orientations because of inconsistency in packing them and need to be sorted before printed plastic cards 22, 24 are affixed to them so that these shall be in the correct positions out of some 16 possibilities.

For all these reasons, it is highly advantageous to use stiff portions comprising transparent material, especially with a doubly concertina-folded sheet 10.

With reference to the use of a plurality of channels, as exemplified in connection with FIGS. 17 and 18, the units mentioned, referring to FIG. 4, may severally be the first feeder 26 for cards 22, the first glue head 54 for these, the second feeder 12 for inserts 10, the second glue head 60 for these, the third feeder 28 for cards 24. The quick-release mechanism may be applied to disconnecting pneumatic power.

In a variation of the FIG. 4 embodiment, means 130 may comprise a plurality of folders acting in parallel to enable faster production to avoid this stage being a bottleneck.

It will be appreciated that use of a two-component adhesive system which requires cross-linking of the components for adhesion allows the whole of cards 22, 24 to be coated with a component and possibly the whole of an outer segment of the folded sheet 10 to be coated with the other component without these being sticky or adhering to anything that they should not Such adhesive systems are well known.

The aforementioned stiffening by applying a coating that can be cured may require several layers of the coating depending upon the material used and the thickness of varnish. This may be normally printed in a single pass to a thickness of 2 to 5 grammes per square metre at a rate of 5000 units being printed per hour. The thickness can be increased by use of a screen printer to 12 to 15 grammes per square metre in a single pass. The system is used with a UV curing lacquer and a continuous UV curing (e.g. drying) system. The composition of the coating material can be adjusted according to requirements of any particular process. For example, lithographic printing can produce a coating some 80 microns (metric) thick which can be cured in 1/1000 second by ultraviolet light to produce a stiffening which is sufficient for many purposes. These compositions can also be used for penetrating the material of sheet 10, hereinbefore called impregnation. An alternative is to use a so-called two-pot system in which a first coating or impregnation with one component is followed by a second application with a second component and these then cross-link automatically (self-curing) and the system may perhaps be enhanced by using overlacquer.

It will be apparent to those skilled in the art that features of the different embodiments may be combined and different features or combinations of features may be novel in their own right and independently of other features or combinations of features so that invention is considered to reside in any new and unobvious features or combinations of features herein disclosed. In case of doubt, the claims are to be interpreted in the most beneficial sense to give the maximum protection consistent with not covering anything known or obvious.

The Features in the following list are considered to be important individually and in all workable combinations:

1. Apparatus for use in producing articles each comprising a sheet folded with concertina folds, characterised in that the article comprises at least one stiff portion attached to an outer segment of the folded sheet, and the apparatus comprises means to supply the folded sheet and stiff portion and attach them together and maintain the sheet folded up to, and possibly during at least part of, the attaching step.

2. Apparatus for use in producing articles each comprising a sheet folded with a first set of concertina folds and transverse to these a second set of concertina folds, characterised in that the article comprises two stiff portions attached to opposite outer segments of the folded sheet, and the apparatus comprises means to supply the folded sheet and said stiff portions and attach them together and maintain the sheet folded up to, and possibly during at least a part of, the attaching step.

3. Apparatus as defined in Feature 1 or 2, characterised in that it comprises means to effect said attaching step and to include gluing and attaching as parts of such step, which means comprise a gluing station followed by an attaching station and means to maintain the sheet folded at or in the region of such a station.

4. Apparatus as defined in any one of Features 1 to 3, characterised in that it comprises means to effect said attaching step and to include gluing and attaching as parts of such step, which means comprise means substantially to maintain the sheet folded before and throughout the attaching step.

5. Apparatus as defined in any one of Features 1 to 4, characterised in that it comprises guide means that are adapted to bear against the folded sheet to maintain it folded during passage of the folded sheet past the guide means.

6. Apparatus as defined in any one of Features 1 to 5, characterised in that it comprises pinch rollers to consolidate the folds after the attaching step.

7. Apparatus for conveying objects, comprising guide means and flights arranged to move along the guide means and thereby push said objects therealong, characterised in that the flights are constructed and arranged to control the mutual relative position of separate elements of each said object during such movement.

8. Apparatus as defined in Feature 7, characterised in that the flights are constructed and arranged to position corresponding edges of the elements mutually relatively displaced in the direction of said movement.

9. Apparatus as defined in Feature 7 or 8, characterised in that the flights are stepped.

10. Apparatus as defined in any one of Features 7 to 9, characterised in that the guide means are shaped to vary the position of said objects relative to the flights during said movement.

11. Apparatus as defined in any one of Features 7 to 10, characterised in that the guide means are shaped to enable the flights to control the mutual relative position of a said object and a further separate element during said movement.

12. Apparatus as defined in any one of Features 7 to 11, characterised in that the guide means comprise a first introductory guide portion for a first said element, and a second introductory guide portion for a second said element, said portions being constructed and arranged to allow said flights to entrain such elements separately and then enable them to meet.

13. Apparatus as defined in Feature 12, characterised in that the guide means comprise a third introductory portion for a third said element, such portions being constructed and arranged to allow said flights to entrain said third element separately from said first and second elements and, after the meeting of said first and second elements, to enable a meeting between an object comprising these first and second elements on the one hand and said third element on the other hand.

14. Apparatus as defined in any one of Features 1 to 6, characterised in that it comprises apparatus as defined in any one of Features 7 to 13.

15. Apparatus as defined in Feature 14, characterised in that it comprises spray gluers and each of said flights comprises an upper and a lower forwardly facing portion of which the upper portion projects slightly forward of the lower portion, and said guide means comprise a runner adapted to position a first said stiff portion at an upper position adjacent the noble of a said spray gluer to be firstly glued thereby and thereafter lower the stiff portion to said lower portion of the flight, a second runner adapted to receive said folded sheet at the level of the upper portion of the flight and lower the same to contact the firstly glued upper surface of said first stiff portion while still being positioned by the upper portion of said flight and pass the folded sheet, maintained folded and attached to the first stiff portion, close to the nozzle of a said spray gluer to be secondly glued thereby and thereafter lower the attached sheet and first stiff portion to be wholly within the lower portion of the flight, and a third runner arranged to receive a second said stiff portion and lower the same to the lower portion of said flight to contact the secondly glued surface of said folded sheet.

16. Apparatus for supplying cards, characterised in that it comprises two store means, and supply means arranged to reciprocate and supply cards alternately from each store.

17. Apparatus as defined in Feature 16, characterised in that it comprises a supply member with two recesses each able to take a single card, arranged to reciprocate between a first position at which it is adapted to receive a card from one said store in one said recess and supply a card from the other recess to a take-off point and second position at which it is adapted to receive a card from the other store in the other recess and supply a card from said one recess to said point.

18. Apparatus as defined in any one of Features 1 to 15, characterised in that it comprises apparatus as defined in Feature 16 or 17.

19. Apparatus for use in producing articles each comprising a sheet folded with concertina folds and at least one stiff portion attached to an outer segment of the folded sheet, characterised in that the apparatus comprises means to supply glue to the folded sheet in order to attach the stiff portion thereto but only within an area that stops short of all edges of the folded sheet.

20. Apparatus as defined in any one of Features 1 to 18, characterised in that it comprises apparatus as defined in Feature 19.

21. Apparatus for use in producing articles each comprising a sheet folded with concertina folds and at least one stiff portion attached to an outer segment of the folded sheet, characterised in that it comprises means to maintain predetermined longitudinal and lateral relative positions between the folded sheet and stiff portion while attaching them together and repeat the same predetermined positions for all of the articles.

22. Apparatus as defined in any one of Features 1 to 20, characterised in that it comprises apparatus as defined in Feature 21.

23. Apparatus for use in producing articles each comprising a sheet folded with concertina folds and at least one stiff portion attached to an outer segment of the folded sheet, characterised in that it comprises a plurality of channels for use in simultaneously producing a plurality of such articles, and a common motive source for the plurality of channels.

24. Apparatus as defined in Feature 23, characterised in that it comprises means for switching off the motive source to each channel independently.

25. Apparatus as defined in Feature 23 or 24, characterised in that each channel comprises at least one operative unit for effecting a step in producing the articles which unit has plug and/or other quick release means to enable it to be released and removed quickly from its position and from any motive source.

26. Apparatus as defined in any one of Features 1 to 22, characterised in that it comprises apparatus as defined in any one of Features 23 to 25.

27. Apparatus for use in producing articles each comprising a sheet folded with concertina folds and at least one stiff portion attached to an outer segment of the folded sheet, characterised in that the apparatus comprises means to attach the folded sheet and stiff portion together by use of a two-component adhesive system that requires the components to be present respectively on the folded sheet and the stiff portion and to meet and cross-link to provide the adhesion between said sheet and portion, said means being adapted to maintain said sheet and portion together for such time and/or in such manner as will enable the cross-linking to become effective.

28. Apparatus as defined in any one of Features 1 to 26, characterised in that it comprises apparatus as defined in Feature 27.

29. Apparatus for use in producing an article comprising a sheet folded with concertina folds, characterised in that it comprises means to maintain the sheet folded while the means provide a separate envelope or sleeve around the folded sheet that will maintain the same folded.

30. Apparatus as defined in any one of Features 1 to 28, characterised in that it comprises apparatus as defined in Feature 29.

31. Apparatus for use in producing an article comprising a sheet folded with concertina folds, characterised in that it comprises means to maintain the sheet folded while the means attach it to another sheet.

32. Apparatus as defined in any one of Features 1 to 30, characterised in that it comprises apparatus as defined in Feature 31.

33. Apparatus for use in producing an article comprising a sheet folded with concertina folds, characterised in that it comprises means to provide an envelope around the folded sheet and maintain the sheet folded during the same and provide to the combination of envelope and sheet details of an addressee suitably visible for postal purposes.

34. Apparatus as defined in Feature 33, characterised in that it comprises means to store a mailing list and transfer said addressee details therefrom to said combination.

35. Apparatus as defined in Feature 34, comprising means to sort and select addressee details from the mailing list store.

36. Apparatus as defined in any one of Features 1 to 32, characterised in that H comprises apparatus as defined in any one of Features 33 to 35.

37. Apparatus for use in producing an article comprising a sheet of material, characterised in that it contains means to stiffen a. portion only of said sheet by an addition thereto of non-stiff matter and possibly curing the same.

38. Apparatus as defined in Feature 37, characterised in that said means are adapted to laminate said portion on one or both sides.

39. Apparatus as defined in Feature 37, characterised in that said means are adapted to coat said portion with a curable composition of said matter and to cure said composition to effect stiffening of said portion.

40. Apparatus as defined in Feature 37, characterised in that said means are adapted to impregnate said portion with a curable composition of said matter and to cure said composition to effect stiffening of said portion.

41. Apparatus as defined in any one of Features 37 to 40 characterised in that said means are adapted to stiffen as aforesaid two opposite corner portions of said sheet.

42. Apparatus as defined in Feature 41, characterised in that it comprises means to fold said sheet with a first set of concertina folds and transverse to these a second set of concertina folds with the outer opposite segments of the folded sheet being the aforesaid corner portions.

43. Apparatus as defined in Feature 42, characterised in that the stiffening means are arranged to stiffen said portions as aforesaid after the folding.

44. Apparatus as defined in any one of Features 1 to 36, characterised in that it comprises apparatus as defined in any one of Features 37 to 43.

45. Apparatus for use in producing articles each comprising a sheet folded with concertina folds, characterised in that the apparatus comprises means to store sheets, store information, select among the stored information, print a said sheet with the selected information, fold the sheet with concertina folds and expel the same maintained folded.

46. Apparatus as defined in Feature 45, characterised in that the apparatus comprises means to store stiff portions and expel two of them and the sheet separately.

47. Apparatus as defined in Feature 45, characterised in that said means are adapted to provide stiffening or a stiff portion at at least one outer segment of the folded sheet.

48. Apparatus as defined in Feature 45 or 47, characterised in that said means are adapted to fold the sheet with a first set of concertina folds and transverse to these a second set of concertina folds and attach a stiff portion to each of two opposite outer segments of the folded sheet.

49. Apparatus as defined in any one of Features 1 to 44, characterised in that it comprises apparatus as defined in any one of Features 45 to 48.

50. Apparatus for use in producing articles each comprising a sheet folded with concertina folds and stiff portions at opposite outer segments of the folded sheet, characterised in that the apparatus comprises means to perforate the sheet along mutually transverse sets of lines and at these lines fold the sheet with a first set of concertina folds and transverse to these a second set of concertina folds and consolidate-such folds.

51. Apparatus for use in producing articles each comprising a sheet folded with concertina folds and with stiffening or stiff portions at opposite outer segments of the folded sheet, characterised in that the apparatus comprises means to perforate the sheet along a part of mutually transverse sets of lines and at these lines fold the sheet with a first set of concertina folds and transverse to these a second set of concertina folds and consolidate such folds whereby one or more segments can be removed from the sheet at the perforations without destroying its ability to be doubly concertina folded as aforesaid.

52. Apparatus as defined in any one of Features 1 to 49, characterised in that it comprises apparatus as defined in Feature 50 or 51.

53. Apparatus for use in producing articles each comprising a sheet able to be folded with a first set of concertina folds and transverse to these a second set of concertina folds along appropriate real or notional lines of the sheet, characterised in that said apparatus comprises laser printer means arranged to print individual frames from a strip or the like of film to respective positions on said sheet separated by said lines.

54. Apparatus as defined in Feature 53, characterised in that it comprises means to produce said folds and effect stiffening of (or the attaching of stiff portions to) opposite outer segments of the folded sheet.

55. Apparatus as defined in Feature 53, characterised in that it comprises means to produce said folds, maintain the sheet folded and effect stiffening of (or the attaching of stiff portions to) opposite outer segments of the folded sheet.

56. Apparatus as defined in any one of Features 1 to 52, characterised in that it comprises apparatus as defined in any one of Features 53 to 55.

57. Apparatus for producing a folded sheet article, substantially according to any embodiment hereinbefore described.

58. Apparatus for producing a folded sheet article, substantially according to any embodiment hereinbefore described with reference to and illustrated in the accompanying drawings.

59. A process for producing articles, each comprising a sheet folded with concertina folds and at least one stiff portion attached to an outer segment of the folded sheet, characterised in that the folded sheet and stiff portion are moved along a predetermined path with their corresponding edges mutually relatively displaced in the direction of such movement and with the sheet maintained folded, during which movement said sheet and portion are initially separate from each other and then attached together.

60. A process as defined in Feature 59, characterised in that after the aforesaid attachment the folded sheet and a second said stiff portion are moved along a predetermined path with their corresponding edges mutually relatively displaced in the direction of such movement and with the sheet maintained folded, during which movement said sheet and second portion are initially separate from each other and then attached together.

61. A process for producing articles, each comprising a sheet folded with concertina folds and at least one stiff portion attached to an outer segment of the folded sheet, characterised in that said stiff portions for said articles are obtained alternately from two stores.

62. A process for producing articles, each comprising a sheet folded with concertina folds and at least one stiff portion attached to an outer segment of the folded sheet, characterised in that in order to attach a said stiff portion to said folded sheet glue is applied to said folded sheet only within an area that stops short of all edges of the folded sheet.

63. A process for producing articles, each comprising a sheet folded with concertina folds and at least one stiff portion attached to an outer segment of the folded sheet, characterised in that a said stiff portion and the folded sheet are maintained in predetermined longitudinal and lateral mutually relative positions while attaching them together and these positions are repeated for all of the articles.

64. A process for producing articles, each comprising a sheet folded with concertina folds and at least one stiff portion attached to an outer segment of the folded sheet, characterised in that a plurality of channels are used for simultaneously producing a plurality of said articles, and motive power to one said channel is switched off while an operative unit for the production is removed from that channel by unplugging and/or other quick release of the unit.

65. A process for producing articles, each comprising a sheet folded with concertina folds and at least one stiff portion attached to an outer segment of the folded sheet, characterised in that there is used, to attach together the folded sheet and a said stiff portion, a two-component adhesive system with one component on the folded sheet and the other component on the stiff portion, which components bond together by cross-linking.

66. A process for producing articles, each comprising a sheet folded with concertina folds and at least one stiff portion attached to an outer segment of the folded sheet, characterised in that it comprises maintaining the sheet folded while providing a separate envelope or sleeve around the folded sheet.

67. A process for producing articles, each comprising a sheet folded with concertina folds and at least one stiff portion attached to an outer segment of the folded sheet, characterised in that it comprises maintaining the sheet folded while attaching it to another sheet, said other sheet at least after the attachment bearing information.

68. A process for producing articles, each comprising a sheet folded with concertina folds, characterised in that an envelope is provided around the folded sheet and the article is provided with details of an addressee suitably visible for postal purposes.

69. A process as defined in Feature 68, characterised in that said addressee details are provided to said article from a mailing list.

70. A process for producing articles, each comprising a sheet of material, characterised in that the process comprises stiffening of a portion only of the sheet by use of non-stiff matter and possibly curing the same.

71. A process as defined in Feature 70, characterised in that the stiffening comprises laminating said portion with said matter.

72A process as defined in Feature 70, characterised in that the stiffening comprises coating said portion with said matter and curing the coating.

73. A process as defined in Feature 69, characterised in that the stiffening comprises impregnating said portion with said matter and curing the impregnation.

74. A process as defined in any one of Features 70 to 73, characterised in that it comprises stiffening as aforesaid of two opposite corner portions of said sheet.

75. A process for producing articles, each comprising a sheet of material, characterised in that it comprises folding the sheet with a first set of concertina folds and transverse to these a second set of concertina folds and stiffening, by the addition of non-stiff matter and possibly curing the same, two outer opposite segments of the folded sheet.

76. A process for producing articles, each comprising a sheet of material, characterised in that it comprises storing said sheets, storing information, making a selection among the stored information, printing a said sheet with the selected information and folding the sheet with concertina folds.

77. A process as defined in Feature 76, characterised in that it comprises storing stiff portions and supplying two of them and a folded said sheet separately.

78. A process for producing articles, each comprising a sheet of material folded with concertina folds, characterised in that the process comprises attaching at least one stiff portion thereto comprising material that is at least partly transparent.

79. A process as defined in Feature 78, characterised in that rt comprises folding the sheet with a first set of concertina folds and transverse to these a second set of concertina folds and attaching to each of two opposite outer segments of the folded sheet stiff portions comprising material that is at least partly transparent.

80. A process for producing articles, each comprising a sheet of material, characterised in that the process comprises perforating the sheet along mutually transverse sets of lines, at these lines folding the sheet with a first set of concertina folds and transverse to these a second set of concertina folds and stiffening (or attaching stiff portions to) opposite corner segments of the sheet.

81. A process for producing articles, each comprising a sheet of material, characterised in that the process comprises perforating the sheet along part only of mutually transverse sets of lines, at these lines folding the sheet with a first set of concertina folds and transverse to these a second set of concertina folds and stiffening (or attaching stiff portions to) opposite corner segments of the sheet whereby one or more segments can be removed from the sheet at the perforations without destroying its ability to be doubly concertina folded as aforesaid.

82. A process for producing articles, each comprising a sheet able to be folded with a first set of concertina folds and transverse to these a second set of concertina folds along appropriate real or notional lines of the sheet, characterised in that it comprises using laser printer means to print individual frames from a strip or the like of film to respective positions on said sheet separated by said lines.

83. A process as defined in Feature 82, characterised in that it comprises producing said folds and effecting stiffening of opposite outer segments of the folded sheet.

84. A process characterised in that it comprises use of apparatus as defined in any one of Features 1 to 58.

85. A process characterised in that it has the features defined in a combination of any two or more Features chosen from the group comprising Features 59, 62 to 68, 70, 75 to 77, 80 to 82, 84.

86. A process for producing articles, each comprising a sheet of material, and substantially according to any example hereinbefore described.

87. A process for producing articles, each comprising a sheet of material, and substantially according to any example hereinbefore described with reference to the accompanying drawings.

88. An article comprising a sheet folded with concertina folds and at least one stiff portion attached to the sheet, characterised in that the attachment is with the aid of adhesive that stops short of all edges of the folded sheet.

89. An article each comprising a sheet folded with concertina folds and at least one stiff portion attached to the sheet, characterised in that the attachment is with the aid of an adhesive system comprising two components one on each of said sheet and said portion the components being cross-linked together.

90. An article comprising a sheet folded with concertina folds and at least one stiff portion attached to the sheet, characterised in that the article further comprises a separate envelope or sleeve in which said sheet is contained to maintain the sheet folded.

91. An article as defined in Feature 90, characterised in that said envelope or sleeve is at least partly transparent.

92. An article comprising a sheet folded with concertina folds and at least one stiff portion attached to the sheet, characterised in that the article further comprises, attached to said sheet, another sheet bearing information.

93. An article comprising a sheet folded with concertina folds and at least one stiff portion attached to the sheet, characterised in that the article further comprises an envelope containing said sheet and has details of an addressee suitably visible for postal purposes.

94. An article comprising a sheet folded with concertina folds and at least one stiff portion attached to the sheet, characterised in that the stiff portion comprises transparent material.

95. An article comprising a sheet folded with concertina folds, characterised in that the article has stiffening of a portion only of the sheet by means of addition thereto of non-stiff matter.

96. An article comprising a sheet folded with a first set of concertina folds and transverse to these a second set of concertina folds, characterised in that the article has stiffening of two opposite outer segments of the folded sheet by means of addition thereto of non-stiff matter.

97. An article as defined in Feature 95 or 96, characterised in that the stiffening comprises lamination.

98. An article as defined in Feature 95 or 96, characterised in that the stiffening comprises a hardened coating.

99. An article as defined in Feature 95 or 96, characterised in that the stiffening comprises a hardened impregnation.

100. An article comprising a sheet folded with a first set of concertina folds and transverse to these a second set of concertina folds, characterised in that the segments thus defined of the sheet bear laser-printed copies of respective individual frames of a strip or the like of film.

101. An article comprising a sheet folded with a first set of concertina folds and transverse to these a second set of concertina folds the sheet being provided with stiffening or stiff portions at its opposite outer segments, characterised in that the segments thus defined of the sheet bear laser-printed copies of respective individual frames of a strip or the like of film.

102. An article as defined in Feature 101, characterised in that said stiff portions comprise transparent material.

103. An article comprising a sheet folded with a first set of concertina folds and transverse to these a second set of concertina folds and with stiffening or stiff portions at opposite outer segments of the folded sheet, characterised in that at least a part of the mutually transverse sets of lines of the folds is perforated.

104. An article characterised in that it is the product of an apparatus or process as defined in any one of Features 1 to 87.

105. An article characterised in that it has the features defined in a combination of any two or more Features chosen from the group comprising Features 88 to 90, 92 to 96, 100, 101, 103, 104.

106. An article comprising a folded sheet and substantially according to any example hereinbefore described.

107. An article comprising a folded sheet and substantially according to any example hereinbefore described with reference to and illustrated in the accompanying drawings.

I claim:

1. Apparatus to produce folded sheet articles, the sheet articles including folded sheet articles consisting of a sheet folded with at least one set of concertina folds having three segments which can be unfolded, the apparatus comprising supply means for supplying the folded sheet to a conveyor for conveying the concertina folded sheet to a providing and attaching region, at which providing and attaching region there is means for providing and attaching at least one stiff portion to an outer one of said three segments of the concertina folded sheet and maintaining means for maintaining the concertina folded sheet folded during at least part of the approach to the providing and attaching region.

2. Apparatus as claimed in claim 1, wherein the providing means comprises supply means to supply the at least one stiff portion to the folded sheet for attaching the folded sheet and stiff portion together.

3. Apparatus as claimed in claim 2, wherein the attaching means comprises a gluing station followed by an attaching station and the maintaining means maintain the folded sheet during the approach to and in the region of said stations.

4. Apparatus as claimed in claim 1, wherein the maintaining means comprises guide means that bear against the folded sheet to maintain the folded sheet folded during passage of the folded sheet along the guide means.

5. Apparatus as claimed in claim 1, comprising conveying means to convey the folded sheet and said at least one stiff portion, the folded sheet and the stiff portion having a mutual relative position during movement by the conveying means, guide means and flights, the flights being entrainment means for the folded sheet and stiff portion and being associated with the guide means to move therealong and to push the folded sheet and stiff portion and at the same time to control the mutual relative position of the folded sheet and stiff portion during movement by said conveying means.

6. Apparatus as claimed in claim 5, wherein the flights include means for positioning the corresponding edges of the folded sheet and stiff portion mutually relatively displaced in the direction of said movement.

7. Apparatus as claimed in claim 5, wherein the flights are stepped.

8. Apparatus as claimed in claim 5, wherein the guide means are shaped to vary the position of the folded sheet and stiff portion relative to the flights during said movement along the conveying means.

9. Apparatus as claimed in claim 5, wherein the guide means are configured such that the flights control the mutual relative position of the folded sheet and stiff portion during said movement along the conveying means.

10. Apparatus as claimed in claim 5, wherein the guide means comprise a first introductory guide portion for a first said element, and a second introductory guide portion for a second said element, said first and second introductory portions being constructed and arranged to allow said flights to entrain such elements separately and then enable them to meet.

11. Apparatus as claimed in claim 10, wherein the guide means comprise a third introductory portion for a third said element, such first, second and third introductory portions being constructed and arranged to allow said flights to entrain said third element separately from said first and second elements and, after the meeting of said first and second elements, to enable a meeting between an object comprising these first and second elements on the one hand and said third element on the other hand.

12. Apparatus as claimed in claim 5, comprising spray gluers and each of said flights comprising an upper and a lower forwardly facing portion of which the upper portion projects slightly forward of the lower portion and said guide means comprise a runner adapted to position a first said stiff portion at an upper position adjacent the nozzle of a said spray gluer to be firstly glued thereby and thereafter lower the stiff portion to said lower portion of the flight, a second runner adapted to receive said folded sheet at the level of the upper portion of the flight and lower the same to contact the firstly glued upper surface of said first stiff portion while still being positioned by the upper portion of said flight and pass the folded sheet, maintained folded and attached to the first stiff portion, close to the nozzle of a said spray gluer to be secondly glued thereby and thereafter lower the attached sheet and said first stiff portion to be wholly within the lower portion of the flight, and a third runner arranged to receive a second stiff portion and lower the same to the lower portion of said flight to contact the secondly glued surface of said folded sheet.

13. Apparatus as claimed in claim 1, comprising maintaining means to maintain the sheet folded while the supply means provide an envelope around the folded sheet that will maintain the folded sheet folded.

14. Apparatus as claimed in claim 1, including means for applying stiffening means to a segment only of said sheet by an addition thereto of material to said segment and stiffening said material.

15. Apparatus as claimed in claim 1, including means for applying a stiffening means to a segment of said sheet to impregnate a segment of the folded sheet with a curable composition and to cure said composition to effect stiffening of said segment.

16. A process for producing folded sheet articles, wherein a sheet folded with at least one set of concertina folds which can be unfolded is supplied by supply means and is conveyed along a pre-determined path, the folded sheet being provided by providing and attaching means with a first stiff portion which is attached directly at an outer segment of the folded sheet, the folded sheet being maintained folded by maintaining means during at least part of the approach to the providing step.

17. A process as claimed in claim 16, wherein the folded sheet and the first stiff portion are moved separately along a predetermined path with their corresponding edges mutually relatively displaced in the direction of such movement and with the sheet maintained folded, during which movement said sheet and the first stiff portion are initially separate from each other and then attached together.

18. A process as claimed in claim 16, including after the aforesaid attachment of a folded sheet and said first stiff portion, moving the folded sheet article and a second stiff portion along a predetermined path with their corresponding edges mutually relatively displaced in the direction of such movement and with the sheet maintained folded, during which movement said sheet article and second portion are initially separate from each other and then attached together.

19. A process for producing articles by means of a process as claimed in claim 16, each article comprising a sheet folded with concertina folds and at least one stiff portion attached to an outer segment of the folded sheet, including the step of obtaining said stiff portions for said articles alternatively from two hoppers storing a plurality of said stiff portions.

20. A process for producing articles by means of a process as claimed in claim 16, each article comprising a sheet folded with concertina folds and at least one stiff portion attached to an outer segment of the folded sheet, including the step, in order to attach a said stiff portion to said folded sheet, of applying glue to said folded sheet only within an area that stops short of all edges of the folded sheet.

21. An article manufactured by a process as claimed in claim 16, comprising a separate envelope or sleeve around the folded sheet that will maintain the same folded and/or comprises an addition to the sheet, cured to effect stiffening of a portion thereof.

22. An article manufactured by a process as claimed in claim 21, in which the addition to the sheet is by impregnation thereof.

* * * * *